US011940289B2

(12) United States Patent
Quint

(10) Patent No.: US 11,940,289 B2
(45) Date of Patent: Mar. 26, 2024

(54) WEATHER ON ROUTE PLANNING

(71) Applicant: Rivian IP Holdings, LLC, Plymouth, MI (US)

(72) Inventor: Jason Quint, Ann Arbor, MI (US)

(73) Assignee: Rivian IP Holdings, LLC, Irvine, CA (US)

(*) Notice: Subject to any disclaimer, the term of this patent is extended or adjusted under 35 U.S.C. 154(b) by 253 days.

(21) Appl. No.: 16/994,887

(22) Filed: Aug. 17, 2020

(65) Prior Publication Data
US 2022/0049973 A1    Feb. 17, 2022

(51) Int. Cl.
*G01W 1/02* (2006.01)
*G01C 21/36* (2006.01)
(Continued)

(52) U.S. Cl.
CPC ....... *G01C 21/3694* (2013.01); *G01C 21/362* (2013.01); *G01W 1/02* (2013.01);
(Continued)

(58) Field of Classification Search
CPC .............. G01C 21/3694; G01C 21/362; G01C 21/3691; G01W 1/02; G01W 1/10; G01W 2203/00; G01W 2201/00; G01W 1/00
See application file for complete search history.

(56) References Cited

U.S. PATENT DOCUMENTS 8,024,111 B1 *   9/2011   Meadows .......... G01C 21/3492
                                                                 340/995.23
2008/0180282 A1 *  7/2008  Brosius ................. G01C 21/00
                                                                 340/995.27
(Continued)

FOREIGN PATENT DOCUMENTS

EP          2778614 A1 *  9/2014  ............. G01C 21/36
WO   WO-2011013687 A1 *  2/2011  ............. G01C 21/26

OTHER PUBLICATIONS

PathAway Manual (PathAway GPS 5 Professional Edition GPS Navigation and Tracking Software for Android Smartphones and Tablets User Manual, Aug. 17, 2018, https://web.archive.org/web/20180817052705/http://pathaway.com/android/manual/PW5PROAndroidManual.html) (Year: 2018).*

(Continued)

*Primary Examiner* — Daniel R Miller
*Assistant Examiner* — Christian T Bryant
(74) *Attorney, Agent, or Firm* — PATTERSON + SHERIDAN, LLP

(57) ABSTRACT

Disclosed embodiments include systems, vehicles, and methods for presenting weather conditions a traveler may encounter while traveling a route. In an illustrative embodiment, a computing device executes instructions to present an integrated route map. An input is received indicative of a trip to be made to a destination by a traveler. A store of route data for an area encompassing the trip is accessed. At least one route is identified. A weather forecasting service is accessed from which expected weather conditions are accessible for the area through the projected time. The expected weather conditions are identified for the location at the projected time. An integrated route map is displayed showing the at least one route and the expected weather conditions for the location at the projected time.

20 Claims, 16 Drawing Sheets

(51) Int. Cl.
*G01W 1/00* (2006.01)
*G01W 1/10* (2006.01)

(52) U.S. Cl.
CPC ........... *G01W 1/10* (2013.01); *G01C 21/3691* (2013.01); *G01W 1/00* (2013.01); *G01W 2201/00* (2013.01); *G01W 2203/00* (2013.01)

(56) References Cited

U.S. PATENT DOCUMENTS

| | | | | |
|---|---|---|---|---|
| 2011/0166777 | A1* | 7/2011 | Chavakula | G01C 21/3667 |
| | | | | 701/533 |
| 2013/0191020 | A1* | 7/2013 | Emani | G08G 1/096827 |
| | | | | 701/468 |
| 2013/0311081 | A1* | 11/2013 | Yamakawa | G01C 21/00 |
| | | | | 701/428 |
| 2013/0321443 | A1* | 12/2013 | Pahwa | G01C 21/367 |
| | | | | 345/587 |
| 2020/0005637 | A1* | 1/2020 | Walker | G06F 3/04817 |

OTHER PUBLICATIONS

Weather On The Way (Weather On The Way, Wayback machine, Weather on the Way—Premium Weather App for Travel, Aug. 10, 2020, https://web.archive.org/web/20200810183945/https://www.weatherontheway.app/) (Year: 2020).*

* cited by examiner

WEATHER ON ROUTE PLANNING

INTRODUCTION

The present disclosure relates to systems, vehicles, and methods for presenting an integrated route map that displays a route and expected weather conditions a traveler may encounter on the route.

The statements in this section merely provide background information related to the present disclosure and may not constitute prior art.

Systems exist that permit retrieval of weather data for selected location. For example, a system may provide current weather information for a location in response to a name of a city or a postal code for a particular location being entered. The system also may provide forecast and/or weather radar for the specified location.

However, when a traveler seeks to plan a car trip or another journey, the traveler may want more information than these systems may provide. For example, a traveler may plan to set out first thing in the morning from the traveler's current location to drive to a destination. The traveler may use a mapping application or another Global Positioning System (GPS) device to determine a route for the trip and how long the trip will take. The traveler can use a separate weather application to check what the weather may be at the current location when the traveler plans to leave. The traveler also may go back to the mapping application to check when the traveler will arrive at the destination if the traveler leaves at the currently-planned departure time. The traveler then may use a weather application to determine what the weather may be at the destination at the estimated arrival time. The traveler may consult the mapping application to identify locations through which the traveler will pass on the way to the destination, then repeatedly check the weather application for each of those locations to see what the weather may be during the journey on the way to the destination.

After working through these processes, the traveler may determine that rain is forecast at the time when the traveler would arrive at the destination or that the traveler would hit a snowstorm along the way. As a result, the traveler may decide to leave earlier in the day or postpone departure until a later time or date to avoid encountering the forecast weather conditions. The traveler would then have to work through the same processes to determine what the forecasted weather may be at the time of departure, at the expected time of arrival, and along the way.

SUMMARY

Disclosed embodiments include systems, vehicles, and methods for presenting an integrated route map that displays a route and expected weather conditions a traveler may encounter on the route.

In an illustrative embodiment, a system includes a computing device that executes instructions to present an integrated route map. An input is received indicative of a trip to be made to a destination by a traveler. A store of route data for an area encompassing the trip is accessed. At least one route is identified. A weather forecasting service is accessed from which expected weather conditions are accessible for the area through the projected time. The expected weather conditions are identified for the location at the projected time. An integrated route map is displayed showing the route and the expected weather conditions for the location at the projected time.

In another illustrative embodiment, a vehicle includes a passenger compartment. The vehicle also includes a drive system configured to motivate, accelerate, decelerate, stop, and steer the vehicle. The vehicle also includes a computing device that executes instructions to present an integrated route map. An input is received indicative of a trip to be made to a destination by a traveler. A store of route data for an area encompassing the trip is accessed. At least one route is identified. A weather forecasting service is accessed from which expected weather conditions are accessible for the area through the projected time. The expected weather conditions are accessed for the location at the projected time. An integrated route map is displayed showing the route and the expected weather conditions for the location at the projected time.

In another illustrative embodiment, in an illustrative method, a route input is received indicating a trip to be made to a destination by a traveler. Map data is accessed including route data for an area encompassing the trip. At least one of at least one route and a timeline for the trip are identified where the timeline includes a projected time at which the traveler will reach a location on the at least one route. A weather forecasting service is accessed from which expected weather conditions are accessible for the area through the projected time. The expected weather conditions are identified for the location at the projected time. The at least one route is displayed including the expected weather conditions for the location at the projected time.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description explains, by way of illustration only and not of limitation, various embodiments for presenting an integrated route map displaying a route and expected weather conditions a traveler will encounter on the route. It will be noted that the first digit of three-digit reference numbers and the first two digits of four-digit reference numbers correspond to the figure number in which the element first appears.

By way of a non-limiting introduction and overview, in various embodiments an integrated route map is presented that displays weather information for a route to be travelled or being travelled. Once a user provides input indicative of a trip to be made to a destination by a traveler, a store of route data for an area encompassing the trip is accessed and one or more routes and a timeline for the trip are identified. The timeline may include a projected time at which the traveler will reach a location on the one or more routes. A weather forecasting service is accessed to retrieve data on expected weather conditions for the area through the projected time. The expected weather conditions are identified for the location at the projected time. An integrated route map is displayed, showing the one or more routes and the expected weather conditions for the location at the projected time.

Now that an overview has been given, details of various embodiments will be explained by way of non-limiting examples given by way of illustration only and not of limitation.

Figure 1:
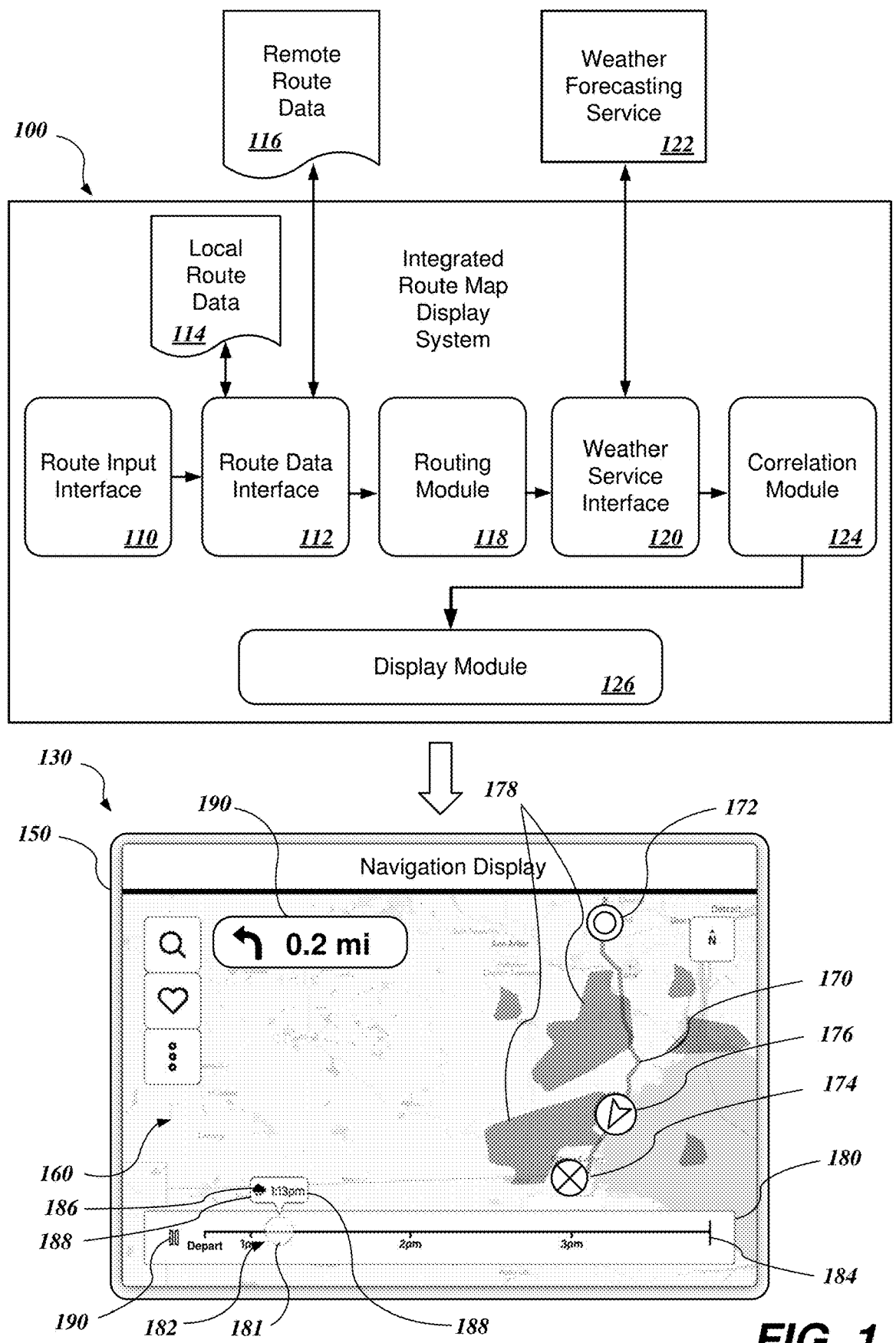
FIG. 1 is a block diagram of an illustrative system for generating and displaying an integrated route map.

Referring to FIG. 1, in various embodiments a system 100 includes various subsystems for presenting an integrated route map. The system 100, as further described below, may be implemented on a computing device having computer-readable media storing instructions configured to cause the computing system to perform the functions herein described. An illustrative computing device is described below.

The system 100 includes a route input interface 110 that enables a traveler or other user to provide input identifying a trip that the user intends to make. The route input interface 110 may enable the user to identify a destination and/or one or more intermediate destinations or waypoints along the route. The route input interface 110 also may enable the user to identify an intended starting point or point of origin of the trip, although the route input interface 110 may default to or enable the user to specify that the user's current location will be the origin of the trip. The route input interface 110 also may enable the user to specify an intended time of departure and/or may default to a current time as the time of departure.

A route data interface 112 enables the system 100 to access a store of route data for an area that may encompass the trip. The route data may include map or other roadway data in the area that may be used to identify one or more available routes of travel between an origin and a destination in the area. The route data may include a local store of route data 114 that may be maintained within the system 100. In various embodiments, the local store of route data 114 may include, for example, map data for a nation in which the user resides and/or in which the system 100 is initially deployed, as well as map data for one or more neighboring nations.

The route data interface 112 also may engage a remote store of route data 116. The remote store of route data 116 may be used to update the local store of route data 114 to present map information that represents new or changed roads or road conditions, and/or data regarding current road or traffic conditions. The remote store of route data 116 also may be used to augment the local store of route data 114 to include map data for one or more additional areas that are not included in the local store of route data 114. The remote store of route data 116 may be maintained on a remote computing system that is accessible by the system 100, as further described below.

A routing module 118 uses the data indicative of the trip received by the route input interface 110 and the route data accessible by the route data interface 112 to identify one or more routes the user may travel from the origin to the destination. In various embodiments, the routing module 118 may employ a vector map of road segments with defined end points of each segment. A process such as Dijkstra's algorithm, an A* algorithm, or another suitable method may be used to determine one or more shortest path trees between the origin and destination. Based on user preferences, such as preferences for or against freeways, the desire to avoid toll roads, and the like, various possible segments may be eliminated from consideration before determining the shortest path tree. The user may be presented with an option to choose from more than one available route.

Each of the one or more routes presented by the routing module 118 is associated with a timeline. The timeline incorporates an expected time of travel between the origin and the destination based on a total time to travel each of the segments included in the route at an anticipated travel speed. The anticipated travel speed may be based on a combination of the legal speed limit for each of the segments, anticipated or actual traffic delays, and one or more additional factors. Based on a specified time of departure (or a presumed time of departure, such as the current time), the timeline indicates an anticipated time of arrival.

A weather service interface 120 accesses weather forecast data for an area encompassing the route (or routes) identified by the routing module 118 for the time period encompassing the time of travel between the origin and the destination represented by the timeline. The weather service interface 120 may access a weather forecasting service 122 that, like the remote store of route data 116, is maintained on a remote computing system that is accessible by the system 100. The weather forecasting service 122 may be accessed via a network and may be maintained on a different or a same remote computing system as the remote store of route data 116.

In various embodiments, the weather forecast data includes weather radar data, including actual weather radar data of existing weather formations or projected weather radar data based on existing and expected weather conditions. In various embodiments, the weather forecast data also may include a forecasted temperature, likelihood of participation (and what kind), and other weather conditions anticipated at times spanned by the timeline. In various embodiments, the weather forecast data also may incorporate available daylight based on sunrise and/or sunset times for the area or areas encompassing the route. In other various embodiments, additional weather parameters may be included, such as an ultraviolet (UV) index, humidity, air quality index, allergen index, and other factors may be presented to or accessible by the user. These additional considerations may be desirable to aid a user in deciding whether to open the roof of a convertible or to drive with the windows open, or whether the user may wish to reschedule the trip.

A correlation module 124 receives the route and weather data collected and/or generated by other modules of the system and generates an integrated route map 150. The integrated route map 150, as described in further detail below, includes a composite of the route data and the weather data spanning the timeline associated with the route. The correlation module 124 communicates with a display module 126 of the system 100 to interactively display the integrated route map 150 on a display 130 for viewing by the user and/or to permit user interaction with the integrated route map 150, as further described below.

In various embodiments, the integrated route map 150 includes several items of visual data. The integrated route map 150 includes a map 160 that represents an area that encompasses a route 170. The map 160 shows roadways, communities, points of interest, geographical features, and other area details. The route 170, which may be one of multiple routes presented (not shown) for selection by the user, shows a route of travel along roadways between an origin 172 and a destination 174. A position indicator 176 represents a position of the traveler along the route 170. As is further explained below, the position indicator 176 may represent a current position of the traveler or an expected position at a selected time.

The integrated route map 150 also may display weather patterns 178 in the area. As described further below, the weather patterns 178 may be associated with particular times on the timeline. In various embodiments, the weather patterns 178 may include fronts, cloud formations, precipitation clusters, or other weather objects that may discernible by weather radar. As will be appreciated, weather radar may represent different weather patterns using different colors, fill patterns, and intensities to signify different weather conditions ranging from cloudy skies or fog, through light and heavy rain to hail or snow, to high wind conditions such as tornadoes. Other weather objects may be represented with directional arrows where the direction shows the wind direction and a thickness or other attribute of the arrow may be indicative of velocity. Atmospheric considerations, such as a UV index, humidity, or an air quality index may be represented with dotted or dashed lines or with indicia of other patterns or colors.

The integrated route map 150 includes a timeline 180 that spans a time period from a departure time 182 through an expected arrival time 184. A sliding input 181 may represent a current time 182 or may be manipulated to select a subsequent time on the timeline 180 to be visualized on the integrated route map 150, as further described below. A current situation indicator 186 may display a time 188 and a current weather condition 189, as described further below. The timeline 180 also may include an animation control 190 to enable a time-lapsed view of movement of the weather formations 178 across the integrated route map 150 corresponding with passage of time along the timeline 180, as further described below.

In various embodiments, the integrated route map 150 also includes other information. For example, while a user is traveling, the integrated route map 150 may include one or more navigational cues 195 to inform the user of a next turn or other navigational maneuver and a distance and/or time until that maneuver is to be made to follow the route 170.

Figure 2:
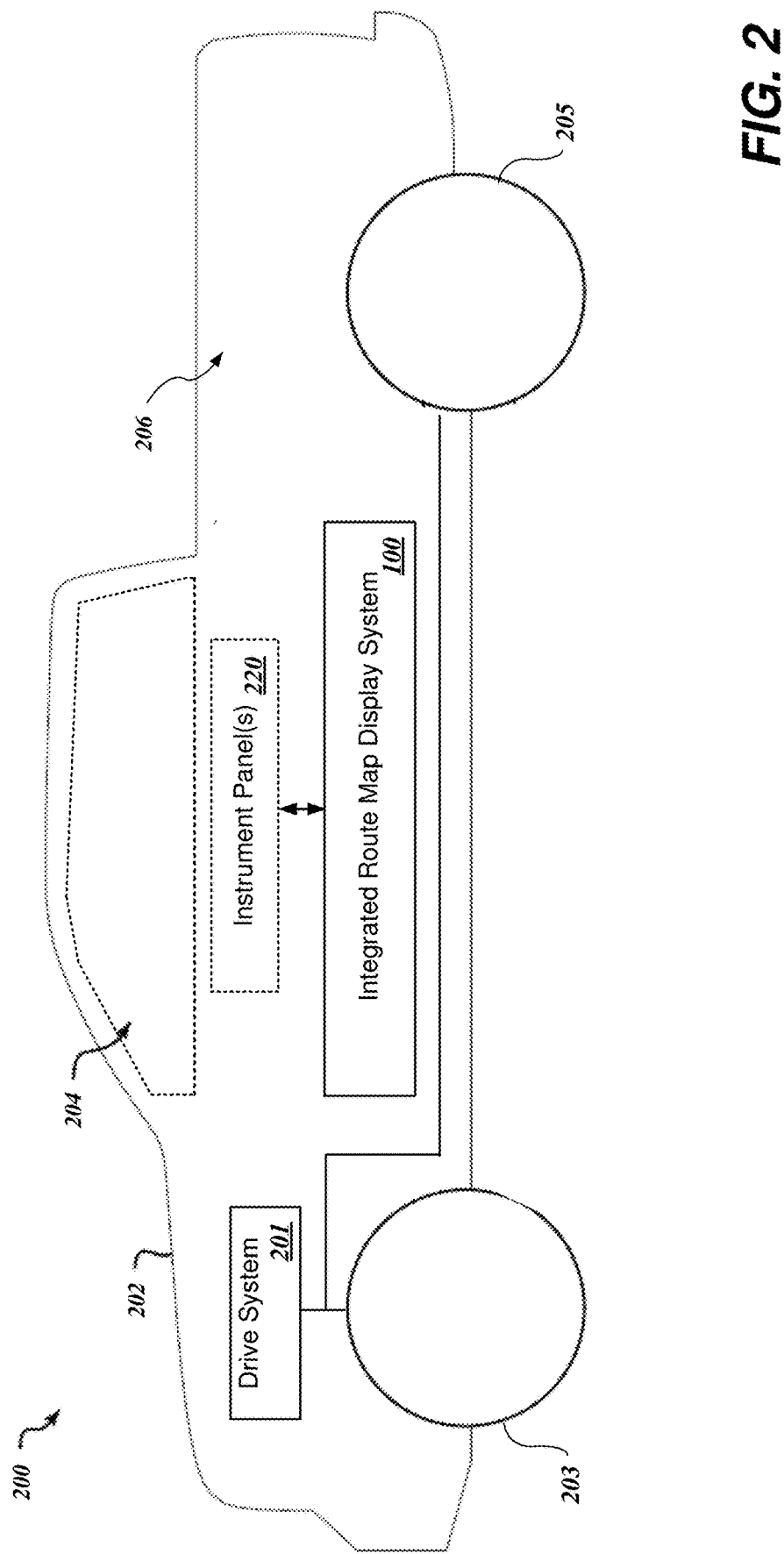
FIG. 2 is a block diagram in partial schematic form of an illustrative vehicle that includes the system of FIG. 1.

Referring to FIG. 2, the integrated route map display system 100 of FIG. 1 may be integrated with a vehicle 200 or transportable aboard a vehicle 200. In various embodiments, the vehicle 200 includes a body 202 that may support a cabin 204 capable of accommodating an operator, one or more passengers, and/or cargo. In various embodiments, the vehicle 200 may be controlled by an operator or the vehicle 200 may be a self-driving vehicle. The vehicle 200 may be an autonomous vehicle that travels without an operator to transport passengers and/or cargo. The body 202 also may include a cargo area 206 separate from the cabin 204, such as a trunk or a truckbed, capable of transporting cargo. The vehicle 200 includes a drive system 201 selectively engageable with one or more front wheels 203 and/or one or more rear wheels 205 to motivate, accelerate, decelerate, stop, and steer the vehicle 200. The drive system 201 may include an electrically-powered system, a fossil-fuel-powered system, a hybrid system using both electric power and fossil fuels, or another type of power source.

In various embodiments, the integrated route map display system 100 may be an integral part of the vehicle 200, including a computing system that is part of the vehicle 200, powered by a power system aboard the vehicle 200, and that uses a display 130 (FIG. 1) that is integrated with one or more instrument panels 220 disposed in the cabin 204 of the vehicle 200. The instrument panels 220 might include various operational gauges, such as a speedometer, tachometer, and odometer, climate controls, entertainment controls, and other instruments along with presenting an integrated route map 150 (FIG. 1). In various embodiments, the integrated route map display system 100 may include a separate computing device transportable aboard the vehicle 200, such as a smartphone, smartwatch, table computer, or other portable computing device. In various embodiments, the integrated route map display system 100 may include a computing device that is usable separate from the vehicle 200, such as a portable or non-portable personal computer usable for trip planning.

Figure 3:
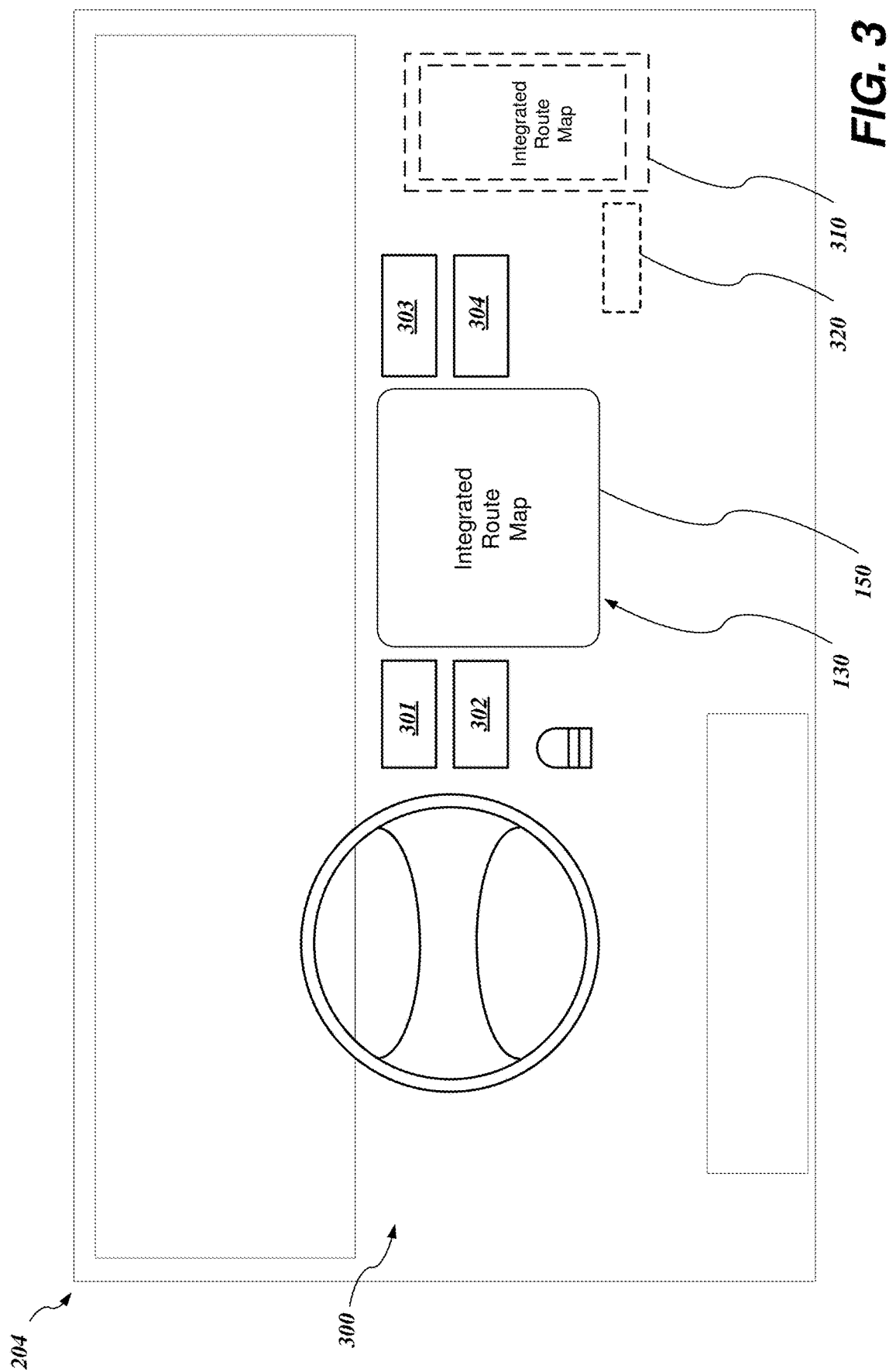
FIG. 3 is a perspective view of a cabin of a vehicle with access to the system of FIG. 1.

Referring to FIG. 3, a dashboard 300 within the cabin 204 shows one of the instrument panels 220 (FIG. 2) that includes the display 130 that presents the integrated route map 150. In various embodiments, the display 130 may include a touchscreen display that enables an individual to directly engage the display 130 to interact with the display, for example, to enter route information or interact with the timeline 180, as further described below. In various embodiments where the display 130 does not include a touchscreen display, controls 301-304 adjacent to the display 130 may enable user engagement with the display 130 to move a cursor, enter characters, or perform other control functions. In various embodiments in which the system 100 is configured to receive voice inputs, a user also may use voice commands to engage the system 100 and thereby interact with the integrated route map 150 and/or other information presented via the display 130.

In various embodiments, instead of or in addition to using the display 130 on the dashboard 300, a portable computing device 310, such as a smartphone, smartwatch, tablet computer, or other portable computing device, may execute an application that operates to provide functions of the integrated route map display system 100. The portable computing device 310 may operate alone or in some combination with a remote computing system, as further explained below. The portable computing device 310 may engage with other systems aboard the vehicle 200, such as a speedometer or other devices, via an interface 320. The interface may include a wireless interface, such as a Bluetooth or Wi-Fi interface, or a wired interface using a USB or other wired connection.

Figure 4:
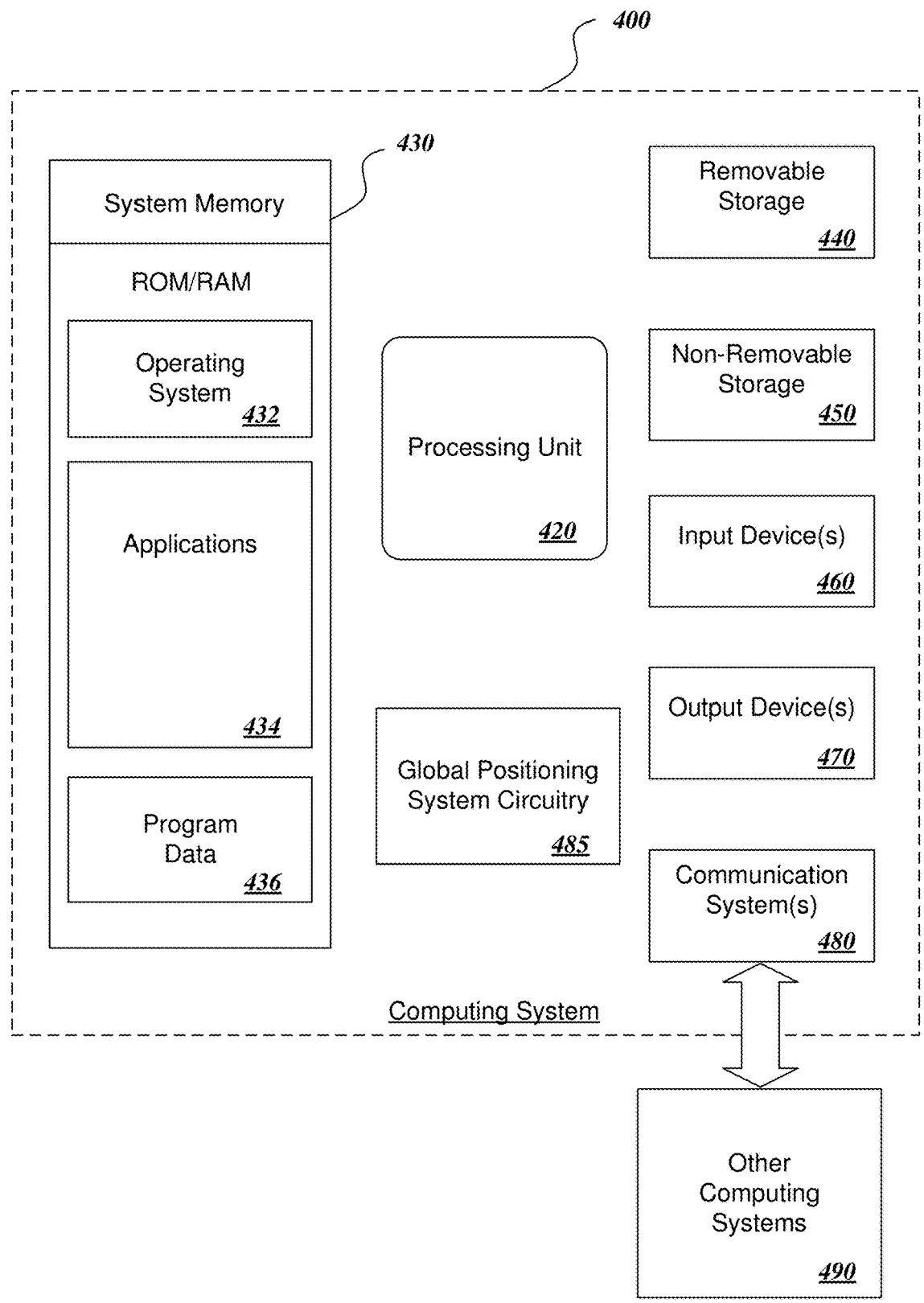
FIG. 4 is a block diagram of an illustrative computing system for performing functions of the system of FIG. 1.

Referring additionally to FIG. 4 and given by way of example only and not of limitation, an illustrative computing system 400 may be used aboard the vehicle 200 (FIG. 2) to perform the functions of the integrated route map display system 100 (FIG. 1). In various embodiments, the computing system 400 typically includes at least one processing unit 420 and a system memory 430. Depending on the exact configuration and type of computing device, the system memory 430 may be volatile memory, such as random-access memory ("RAM"), non-volatile memory, such as read-only memory ("ROM"), flash memory, and the like, or some combination of volatile memory and non-volatile memory. The system memory 430 typically maintains an operating system 432, one or more applications 434—such as computer-executable instructions to support operation of the integrated route map display system 100—and program data 436. The operating system 432 may include any number of operating systems executable on desktop or portable devices including, but not limited to, Linux, Microsoft Windows®, Apple OS®, or Android®, or a proprietary operating system.

The computing system 400 may also have additional features or functionality. For example, the computing system 400 may also include additional data storage devices (removable and/or non-removable) such as, for example, magnetic disks, optical disks, tape, or flash memory. Such additional storage is illustrated in FIG. 4 by removable storage 440 and non-removable storage 450. Computer storage media may include volatile and non-volatile, removable and non-removable media implemented in any method or technology for storage of information, such as computer-readable instructions, data structures, program modules or other data. The system memory 430, the removable storage 440, and the non-removable storage 450 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing system 400. Any such computer storage media may be part of the computing system 400.

The computing system 400 may also have input device(s) 460 such as a keyboard, stylus, voice input device, touch-screen input device, etc. Output device(s) 470 such as a display, speakers, short-range transceivers such as a Bluetooth transceiver, etc., may also be included. The computing system 400 also may include one or more communication systems 480 that allow the computing system 400 to communicate with other computing systems 490, as further described below. As previously mentioned, the communication system 480 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

In further reference to FIG. 4, the computing system 400 may include global positioning system ("GPS") circuitry 485 that can automatically discern its location based on relative positions to multiple GPS satellites. As described further below, GPS circuitry 485 may be used to determine a location of the vehicle 200. In various embodiments, the GPS circuitry 485 may be used to determine a position of the vehicle 200 for generation and analysis of the integrated route map 150.

Figure 5:
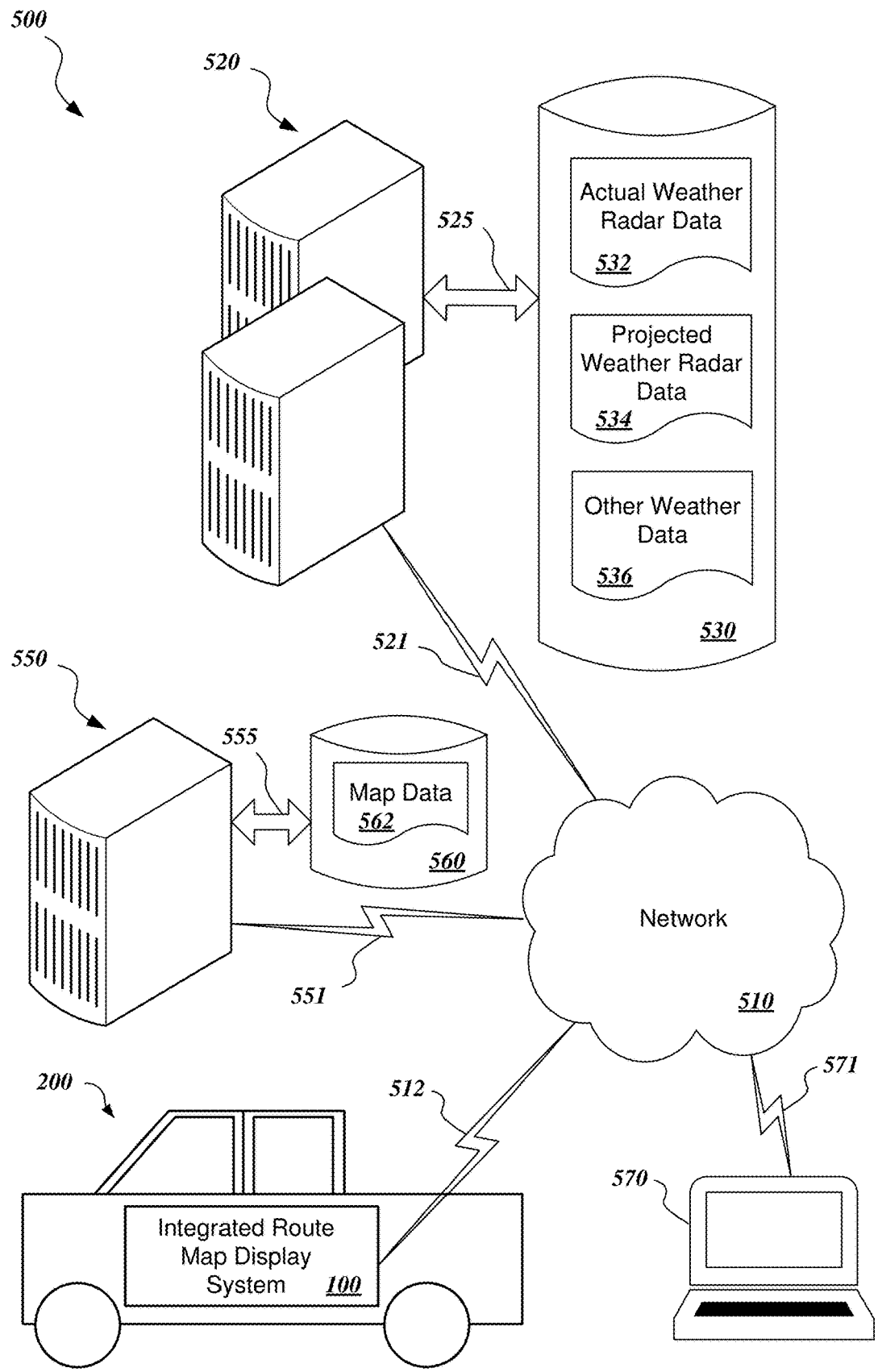
FIG. 5 is a block diagram of an illustrative on-board computing system communicating with one or more remote systems.

In addition to one or more onboard computing systems, various embodiments may communicate with remote computing systems to perform the functions herein described. Referring to FIG. 5, an operating environment 500 may include one or more sets or remote computing systems 520 and 550. A first remote computing system 520 supports a weather reporting service and a second remote system 550 supports a map or route data service. It will be appreciated that the remote systems 520 and 550 may be separate services or the functions of both the remote systems 520 and 550 may be combined into a single system.

The remote computing system 520 and 550 each may include a server or server farm and may communicate with the network 510 over wired and/or wireless communications links 521 and 551, respectively. The remote computing systems 520 and 550 may access programming and data used to perform their functions over high-speed buses 525 and 555 to interact with data storage 530 and 560, respectively. In various embodiments, the remote computing system 520 may service requests for actual weather radar data 532, projected weather radar data 534, and other weather data 536 maintained in the data storage 530. The weather data 532, 534, and 536 is providable to the integrated route map display system 100 for the generation of integrated route maps 150, as further described below. In various embodiments, the remote computing system 550 may service requests for map data 562 to serve the route data interface 112 of the integrated route map display system 100 or to augment or update the store of local route data 114 maintained by the integrated route map display system 100, as previously described with reference to FIG. 1.

The integrated route map display system 100 may be disposed aboard the vehicle 200. As previously described, the integrated route map display system 100 may be supported by a computing device integrated with the vehicle 200 or supported by a portable computing device carried aboard the vehicle 200, as previously described. The integrated route map display system 100 may communicate over the network 510 via a communications link 512 to access the remote computing systems 520 and 550 to access weather and/or map data. The communications link 512 may include a wireless communications link to enable mobile communications with a system aboard the vehicle 200 or may include a wired link when the vehicle 200 is stopped.

The integrated route map display system 100 also may be supported by a computing system 570 that is not integrated with or transportable aboard the vehicle 200. The computing system 570 may be used to generate the integrated route map 150 (FIG. 1) for travel planning purposes and/or to input route and timing information for an integrated route map 150 to be sent to or made available for a computing device aboard the vehicle 200. The computing system 570 may communicate over the network 510 via a communications link 571 to access the remote computing systems 520 and 550 to access weather and/or map data. The communications link 571 may include a wireless or a wired communications link.

Figure 6:
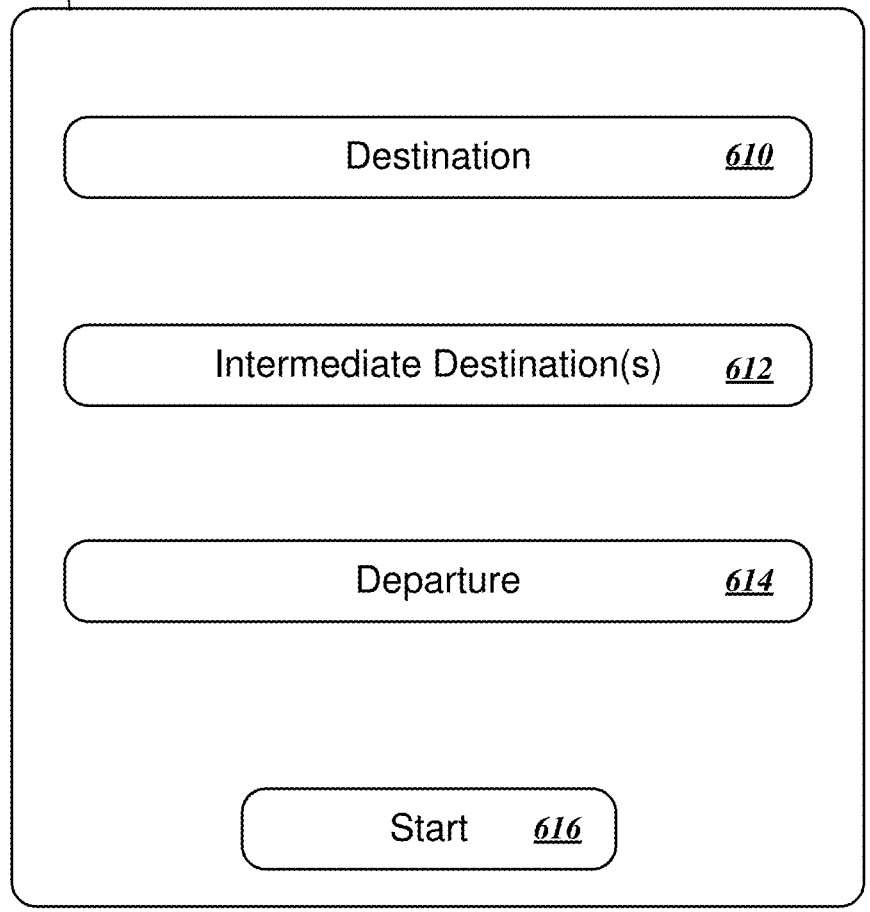
FIG. 6 is a block diagram of an illustrative screen display for receiving user input about a trip.

Operation of the integrated route map display system 100 is further described with reference to the following figures. Referring to FIG. 6, a route input screen 600 enables a user to enter information about a trip to potentially be taken. The route input screen 600 includes a destination input 610 in which a user can enter an address, a coordinate location, or another descriptor to indicate a destination of a trip. When the destination input 610 is a touchscreen, engaging the destination input may invoke a keyboard into which a user can enter an address, coordinates, or other information to identify a destination for a trip. Alternatively, instead of using a touch screen, the destination input 610 may be engaged by voice input or other controls, such as conventional controls available on a computing system or, for example, the input controls 301-304 (FIG. 3) maintained on a vehicle dashboard 300.

Additionally, the route input screen 600 may include an intermediate destination(s) input 612 to enable the user to identify waypoints or other places the user may wish to go on the way to the destination identified via the destination input 610. The destination(s) input 612 may operate via touchscreen input, voice input, or other inputs as previously described to identify any intermediate destination(s). The route input screen 600 also may include a departure input 614 to enable a user to specify a time of departure, if the user is not planning to depart at the present time. In various embodiments, if the departure input 614 is not engaged, the departure time may default to or be assumed to be the current time. Once the user has entered the desired information, the user may engage a start button 616 to generate and display the route data. Descriptions of subsequent screen displays that show a specified route assumes that the user has already engaged the route input screen 600 to identify at least one destination of a trip.

Figure 7A:
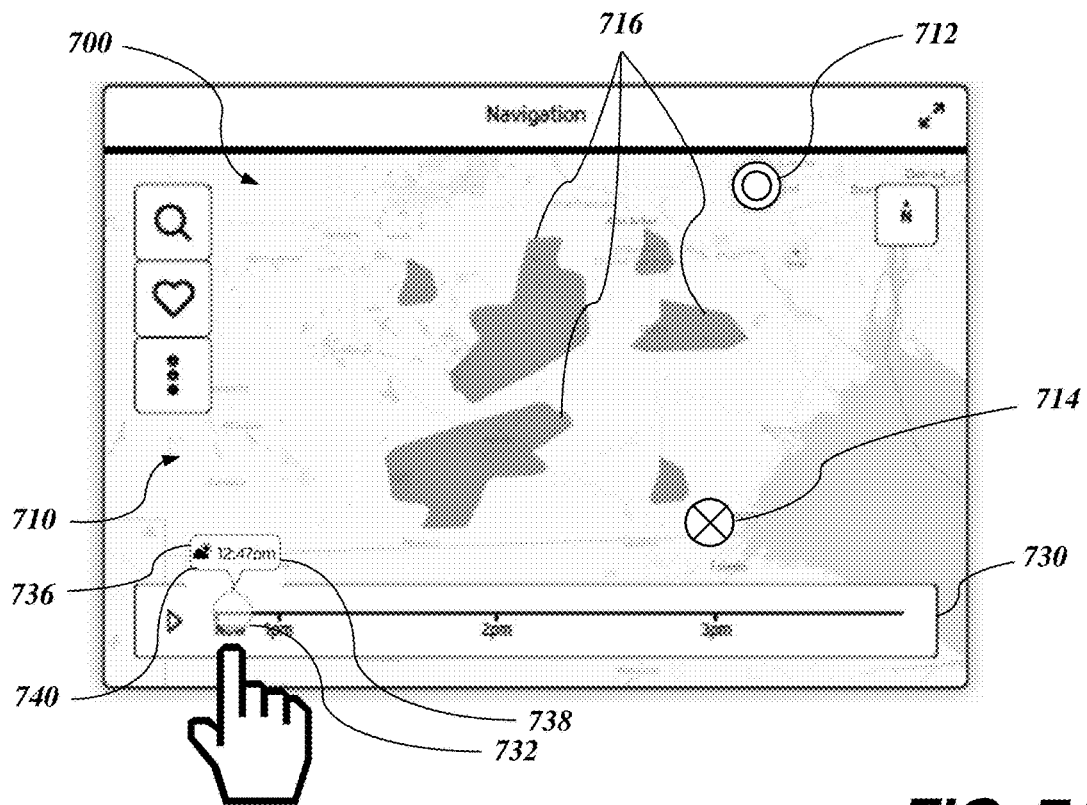
FIGS. 7A and 7B are block diagrams of an illustrative screen display that shows updating of an integrated route map in response to user input.
Figure 7B:
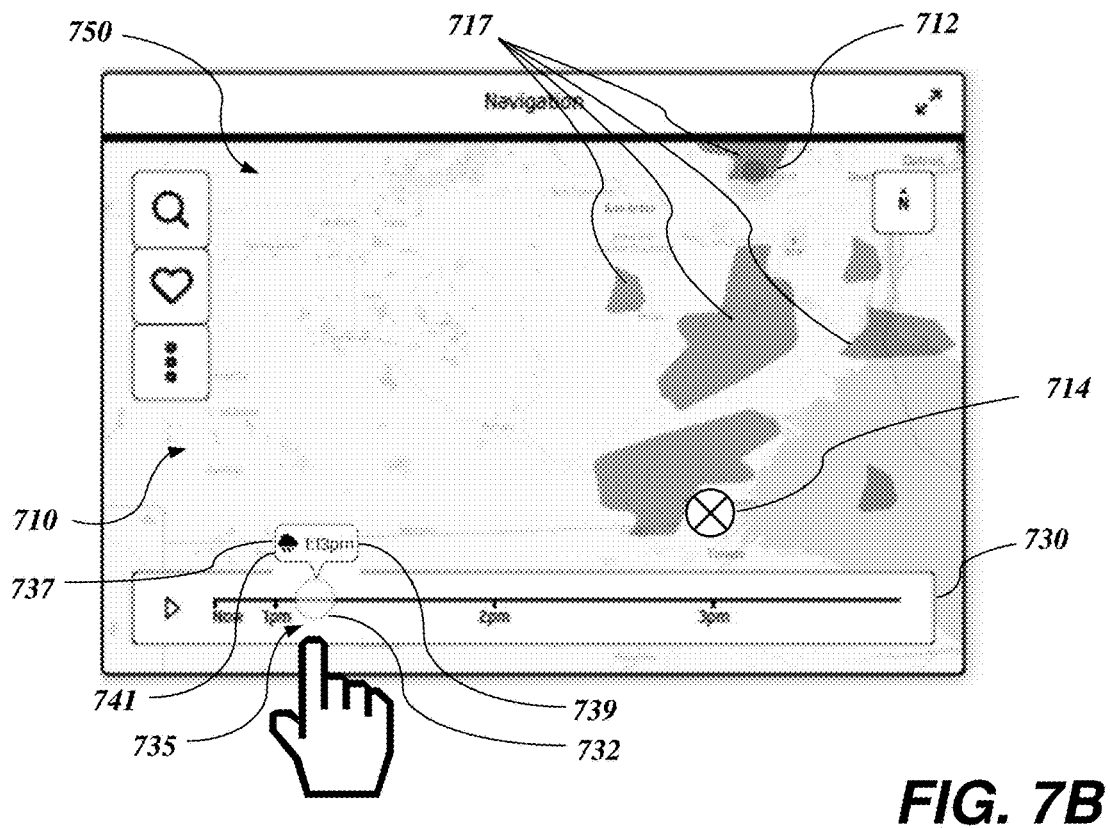

Referring to FIGS. 7A and 7B, embodiments of the integrated route map display system 100 (FIG. 1) may present weather conditions to aid a user in planning a trip or may present weather conditions during travel even when no route information has entered to allow the user to see the local weather. Referring to FIG. 7A, an integrated route map 700 may be used for making or adjusting trip planning. The integrated route map 700 includes a map 710 of an area near or surrounding a point of origin 712. The point of origin 712 may be a location where the user is currently located or that the user has otherwise identified. As previously described, the point of origin 712 may be determined from GPS data and used as a default unless the user identifies another location. The map 710 may include both the origin 712 and, if specified, a destination 714.

As previously described, the integrated route map display system 100 retrieves weather forecast data for the area and displays weather formations 716 currently in the area covered by the map 710. The weather forecast data retrieved may include current or projected weather radar data for the area that is superimposed upon or otherwise presented as part of the integrated route map 700.

According to various embodiments, the integrated route map 700 also includes a timeline 730 that may span a period of time beginning at a current time or another specified starting time. In various embodiments, a sliding input 732 may be moved along the timeline 730 to choose a different time to display for the integrated route map 700. The sliding input 732 currently is set at a current time 734, identified as "Now" in FIG. 7A. As a result, the weather formations 716 are depicted for the current time 734. In addition, a current situation indicator 736 is presented to show a specific time 738 indicated by a position of the sliding input 732 which, in the example of FIG. 7A, is 12:47 p.m. The current situation indicator 736 also may include a weather indicator 740 that represents the weather for the point of origin 712 at the selected time 738. The weather indicator 740 may present a symbol (as shown in FIG. 7A) that shows weather and daylight conditions at the point of origin 712 at the selected time 738. In the example of FIG. 7A, the weather indicator 740 shows that it is daytime and that it is partly cloudy.

Referring to FIG. 7B, another integrated route map 750 again includes the map 710 of the area encompassing the point of origin 712 and the destination 714. However, the integrated route map 750 of FIG. 7B shows the forecast weather conditions at a subsequent time as a result of the user manipulating the sliding input 732 along the timeline 730 to a second time 735. To correspond with the second time 735, the weather formations 717 have been updated to shown how the weather formations have changed or have moved since the previous time 734 (FIG. 7A). In the example of FIG. 7B, a current situation indicator 737 shows a new current time 739 as 1:13 p.m., which was selected from the timeline 730 by manipulation of the sliding input 732. The current situation indicator 737 also includes a weather indicator 741 that, in the example of FIG. 7B, shows that the weather conditions have changed from partly cloudy to rainy. Thus, in various embodiments, a user can engage and manipulate the integrated route map display system 100 to plan when to depart on a trip in consideration of what the weather conditions may be at different departure times.

Figure 8A:
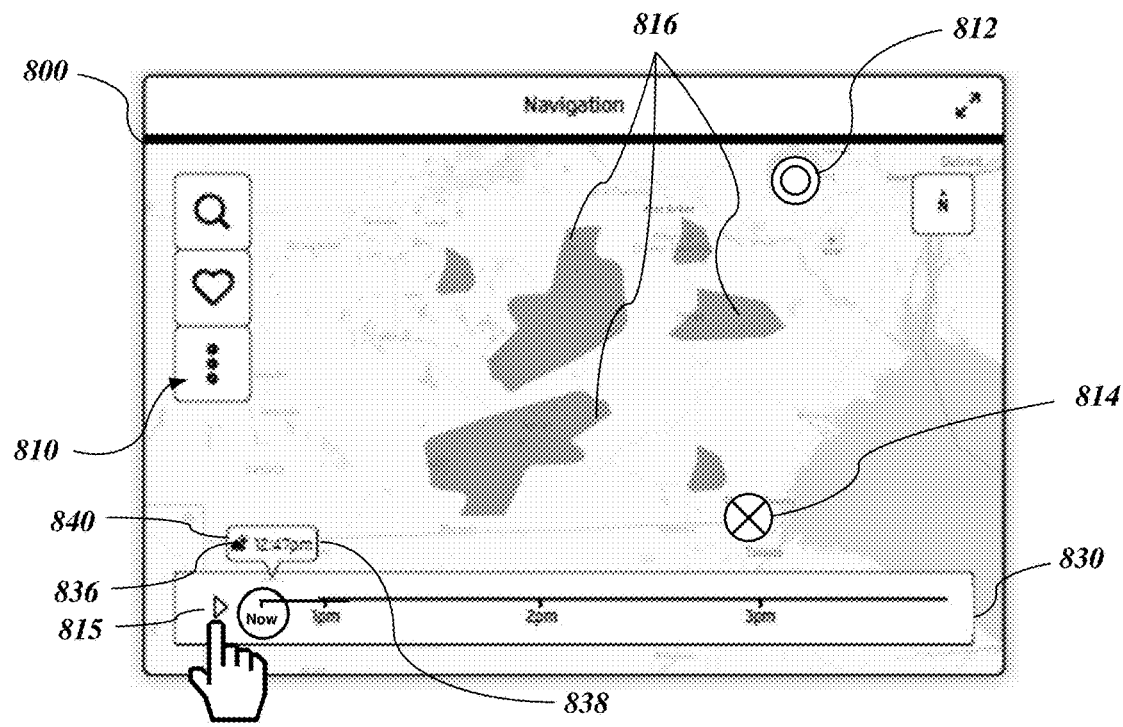
FIGS. 8A-8D are block diagrams of an illustrative screen display that show a series of views of an integrated route map.

Referring to FIGS. 8A-8D, an animation control 815 may be used to initiate a presentation of a series of views of weather conditions for a period covered by a timeline 830. Thus, instead of the user moving the sliding input 732 (FIGS. 7A and 7B) to select specific times to view the weather conditions at that time, a series of views of the weather conditions at various intervals may be sequentially and automatically presented. Referring to FIG. 8A, an integrated route map 800 includes a map 810 for an area encompassing a point of origin 812 and a destination 814. Weather formations 816 are shown for a currently represented time. A current situation indicator 836 shows the currently represented time 838 (12:47 p.m.) and a weather indicator 840. To initiate the presentation of a series of views of weather conditions for the period covered by the timeline 830, a user engages the animation control 815. The animation control 815 may be a virtual button on a touchscreen that may be engaged, for example, by tapping the animation control 815 with a finger, or the animation control 815 may be activated by a physical button, by issuing a voice command, or by another method of engaging with the integrated route map display system 100.

Figure 8B:
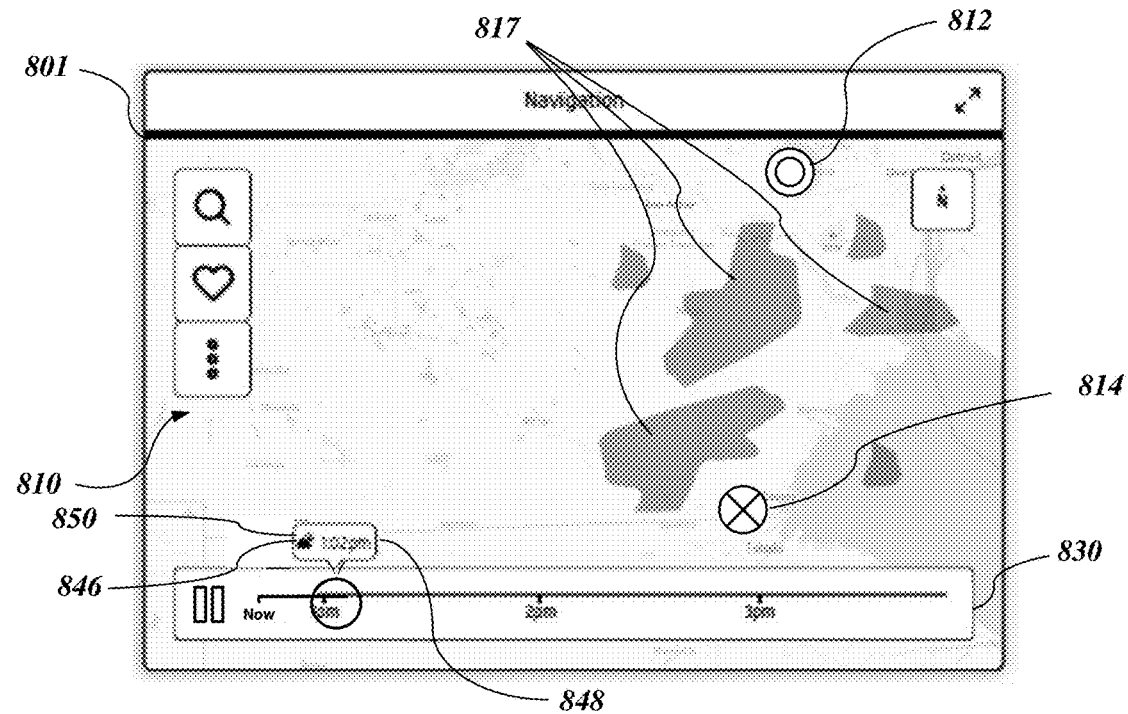
Figure 8C:
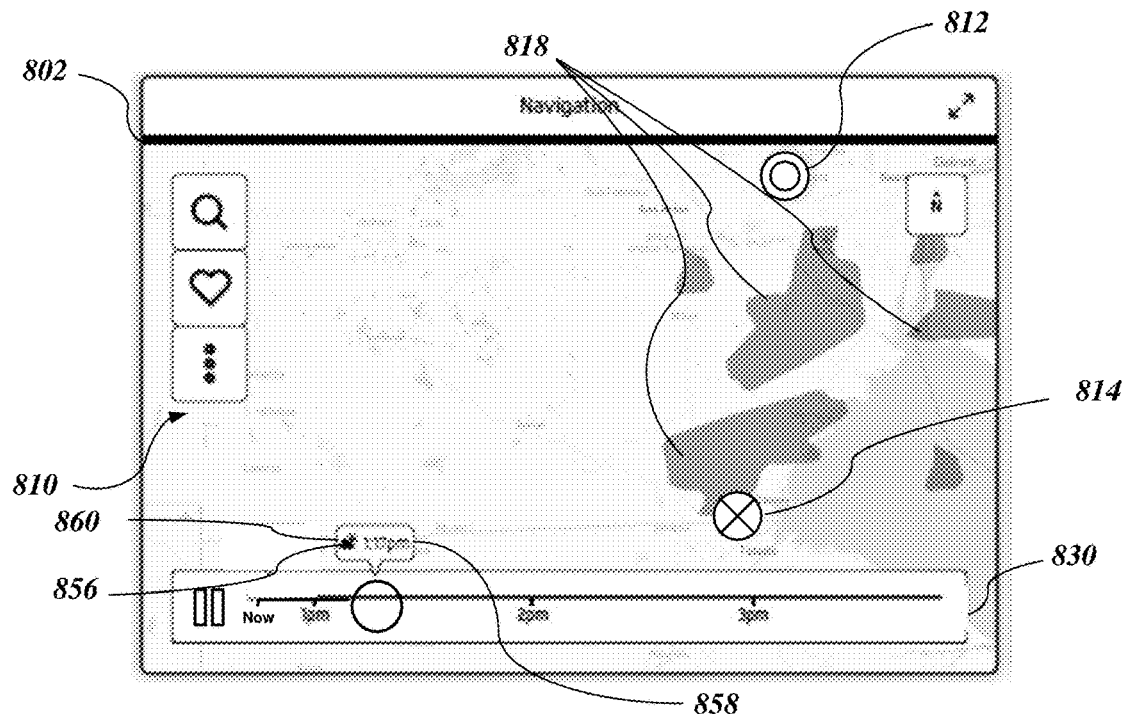
Figure 8D:
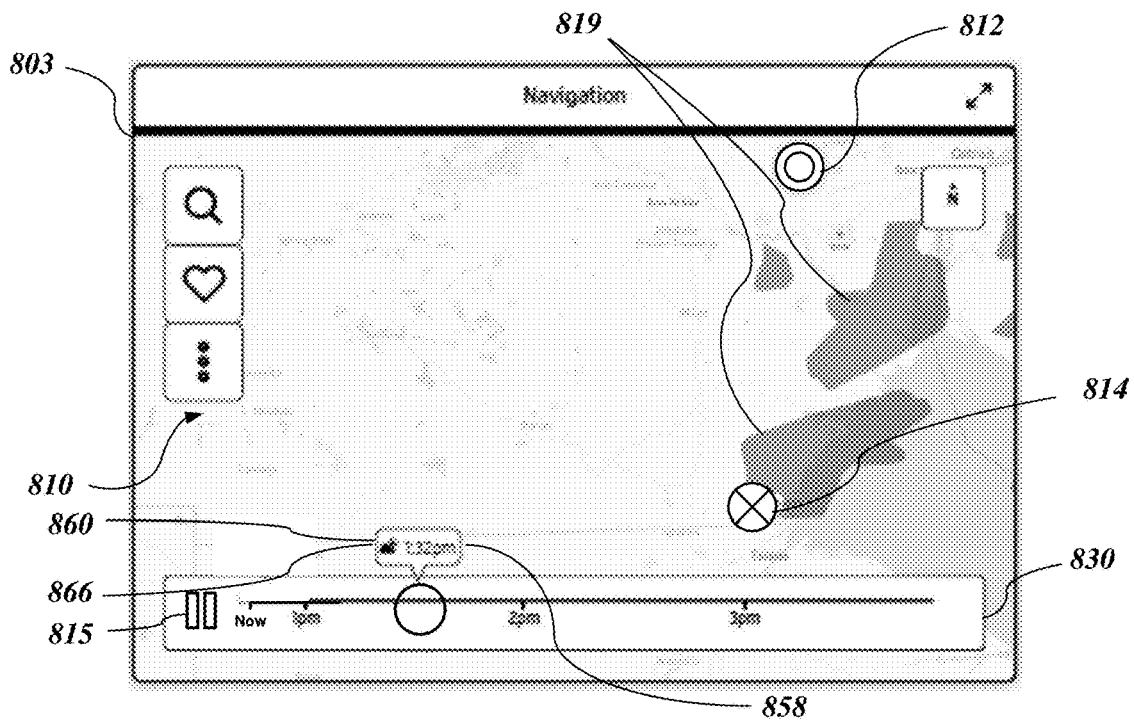

FIGS. 8B-8D show a series of subsequent views presented as a result of engaging the animation control 810. Referring to FIG. 8B, an integrated route map 801 includes updated weather formations 817 after passage of a time interval. In the example of FIGS. 8A-8D, the interval is 15 minutes. As shown by a situation indicator 846, a currently represented time 848 is 1:02 p.m., 15 minutes after the currently represented time 838 of FIG. 8A. The weather formations 817 show that the weather formations 816 (FIG. 8A) have moved to east, edging toward the origin 812 and the destination 814. A weather indicator 850 shows that the current weather at the point of origin continues to be partly cloudy.

Referring to FIG. 8C, an integrated route map 802 includes updated weather formations 818 after passage of another 15-minute interval. As shown by a situation indicator 856, a currently represented time 858 is 1:17 p.m., another 15 minutes after the currently represented time 848 of FIG. 8B. The weather formations 818 have continued to move to the east. Although the weather formations 818 are moving into the area of the destination 814, a weather indicator 860 shows that the current weather at the point of origin 812 continues to be partly cloudy.

Referring to FIG. 8D, an integrated route map 803 includes further updated weather formations 819 after passage of another 15-minute interval. As shown by a situation indicator 866, a currently represented time 868 is 1:32 p.m., another 15 minutes after the currently represented time 858 of FIG. 8C. The weather formations 819 have continued to move to the east, moving away from the point of origin 812 and beginning to move away from the destination 814. A weather indicator 870 shows that the current weather at the point of origin 812 continues to be partly cloudy.

Based on the series of views of weather conditions presented, a user may see that, by postponing his or her departure, the trip to the destination may be made without encountering inclement weather at the point of origin 812, at the destination 814, or points therebetween. The series of views sequentially presented by engaging the animation control 815 enables the user to evaluate the change in weather conditions spanning the timeline 830 without manually selecting individual times as described with reference to FIGS. 7A and 7B. In various embodiments, the animated presentation of the series of views may continue to loop through the times along the timeline 830 until the animation control 815 is once more engaged to stop the presentation of the series of views. It will be appreciated that the animation control 815 may include a toggle-type switch that may be engaged once to initiate the animation and engaged again to stop the animation.

In various embodiments, the animation may present views in various ways. For example, the animation may present views that are one minute apart so that the animation will appear as a relatively smooth, continuous video. Alternatively, the interval between views may be several minutes apart which may result in a less smooth animation, but may use less bandwidth or other resources to generate. In various embodiments, a user may be able to set or change options as to whether the series of views is automatically repeated, how often the series is repeated, and/or how long a view of each interval is displayed before a next view is presented. In various embodiments, the user may be able to set or change other options via an interface of the integrated route map display system 100.

Figure 9A:
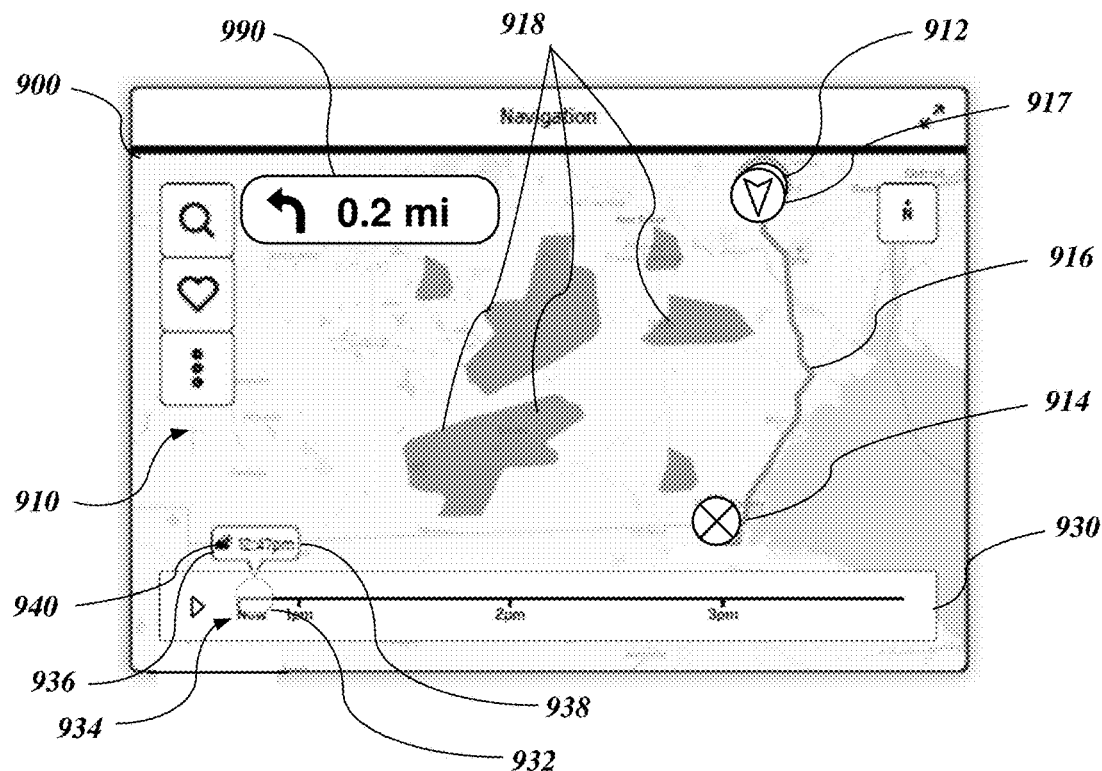
FIGS. 9A and 9B are block diagrams of an illustrative screen display that show progress of a user along a route and related weather conditions.
Figure 9B:
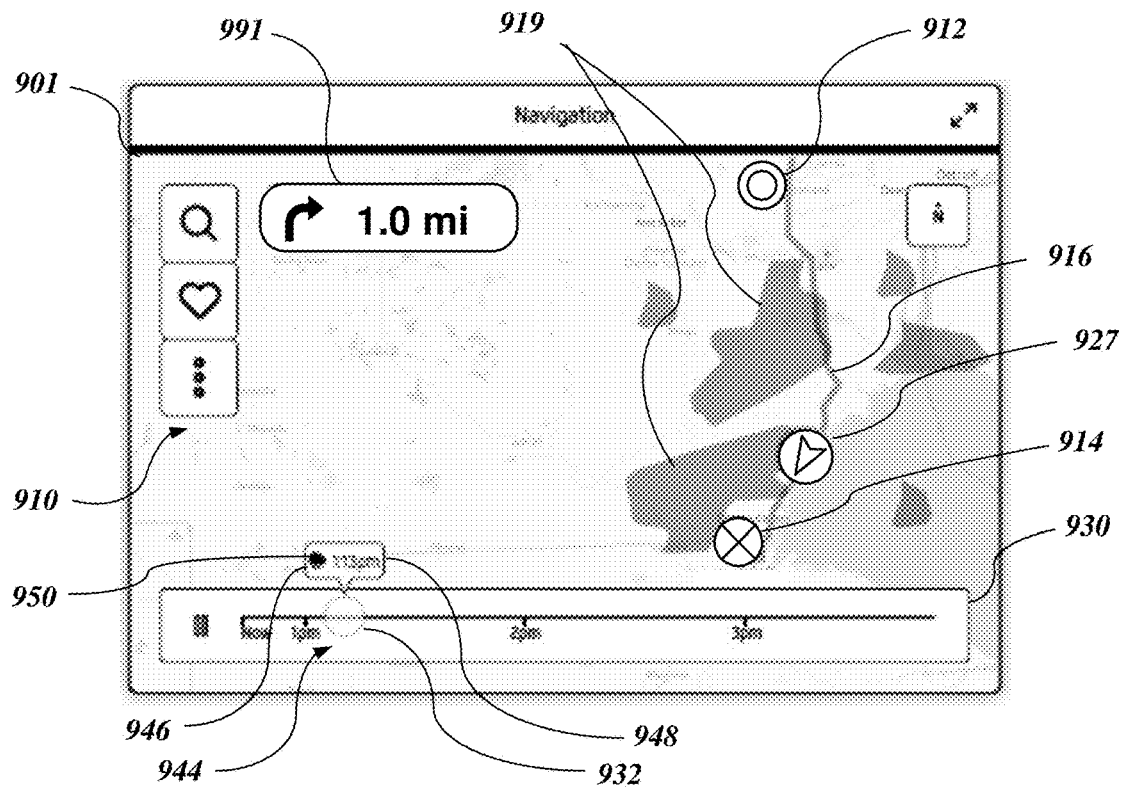

Referring to FIGS. 9A and 9B, integrated route maps 900 and 901 may be used while a user is traveling and, thus, may show development and movement of weather formations, progress along a route, and how weather may interact with travel along the route. Referring to FIG. 9A, the integrated route map 900 shows a map 901 that encompasses an area including a point of origin 912 and a destination 914. Using methods as previously described, the integrated route map display system 100 identifies one or more routes that may be traveled between the point of origin and the destination 914. An identified and/or selected route 916 between the point of origin 912 and the destination 914 is displayed on the integrated route map 900. A position indicator 917 identifies a current location of the user, which may be generated from GPS data as previously described. The position indicator 917 reflects that, in the situation represented by FIG. 9A, the user is still at or just leaving the point of origin 912. A sliding indicator 934 along the timeline 930 shows identifies a current point in time 934 along the timeline.

Weather formations 918 are shown for a currently represented time. A current situation indicator 936 shows the currently represented time 938 (12:47 p.m.) and a weather indicator 940 that shows that the weather is currently partly cloudy at the current time and location. In various embodiments, a navigational cue 990 also may be presented to alert the user to the next turn or other navigational maneuver to remain on the route 916 and a distance until that maneuver should be made.

According to various embodiments of the integrated route map display system 100, as the user travels along the route 916, a user's location, the weather conditions, and the weather locations at the user's location are updated. Referring to FIG. 9B, a position indicator 927 shows the user's progress along the route 916 toward the destination 914. Changed or moved weather formations 919 are shown for a currently represented time which, in the example of FIG. 9B, shows the weather formations 919 having moved into the route 916 traveled by the user. A current situation indicator 946 shows the currently represented time 948 (1:13 p.m.) and a weather indicator 950 that shows that the weather is rainy at the current time and location. The sliding indicator 934 has moved along the timeline 930 to identify a current point in time 944 along the timeline. A navigational cue 991 also may be presented to alert the user to the next turn or other navigational maneuver to remain on the route 916 and a distance until that maneuver should be made.

Thus, the example of FIGS. 9A and 9B shows how various embodiments of the integrated route map display system 100 enable a user to get directions and view upcoming weather forecast data but, as the user travels a provided route, the user can see how the weather may impact travel the route 916. For example, the user can thus choose to alter travel plans, such as by stopping to avoid undesirable weather or to allow the weather to pass, or, at least, to be prepared for the expected weather conditions.

In various embodiments, the integrated route map display system 100 (FIG. 1) may display weather conditions at the user's location without the user specifying a route. Accordingly, without specifying a route, the integrated route map display system 100 enables a user to monitor current, changing, or developing weather in an area around the user's location.

Figure 10A:
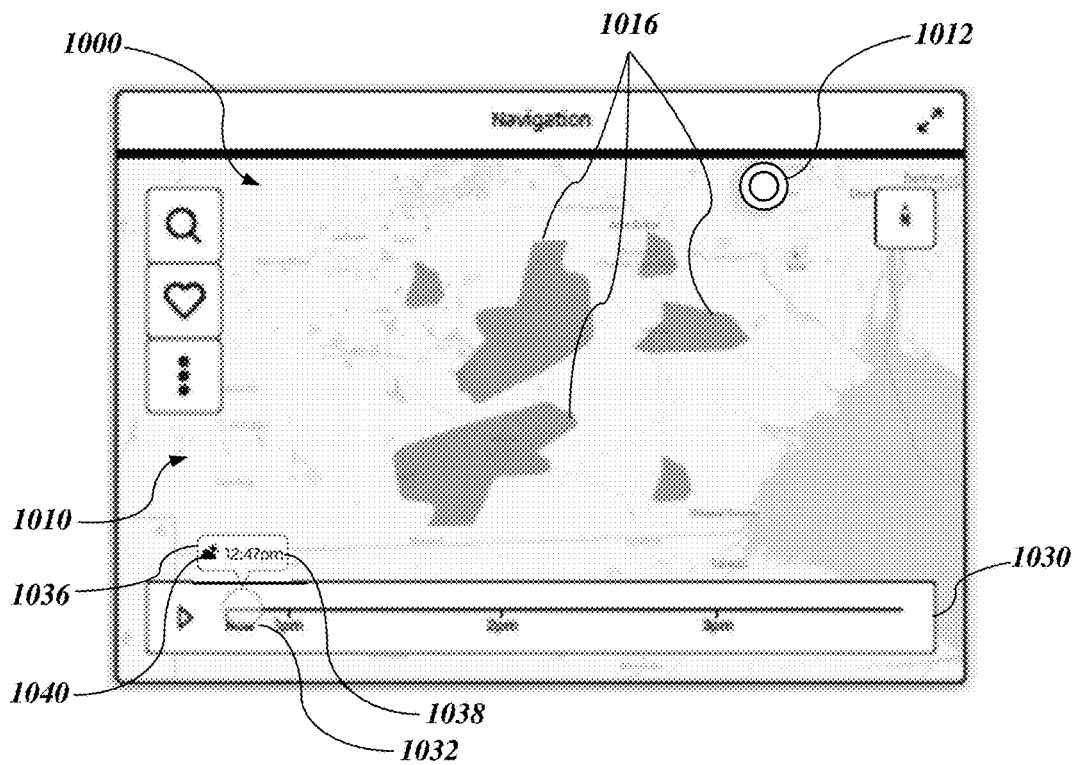
FIGS. 10A and 10B are block diagrams of an illustrative screen display that show changing weather conditions as a user travels without entering a specified route.
Figure 10B:
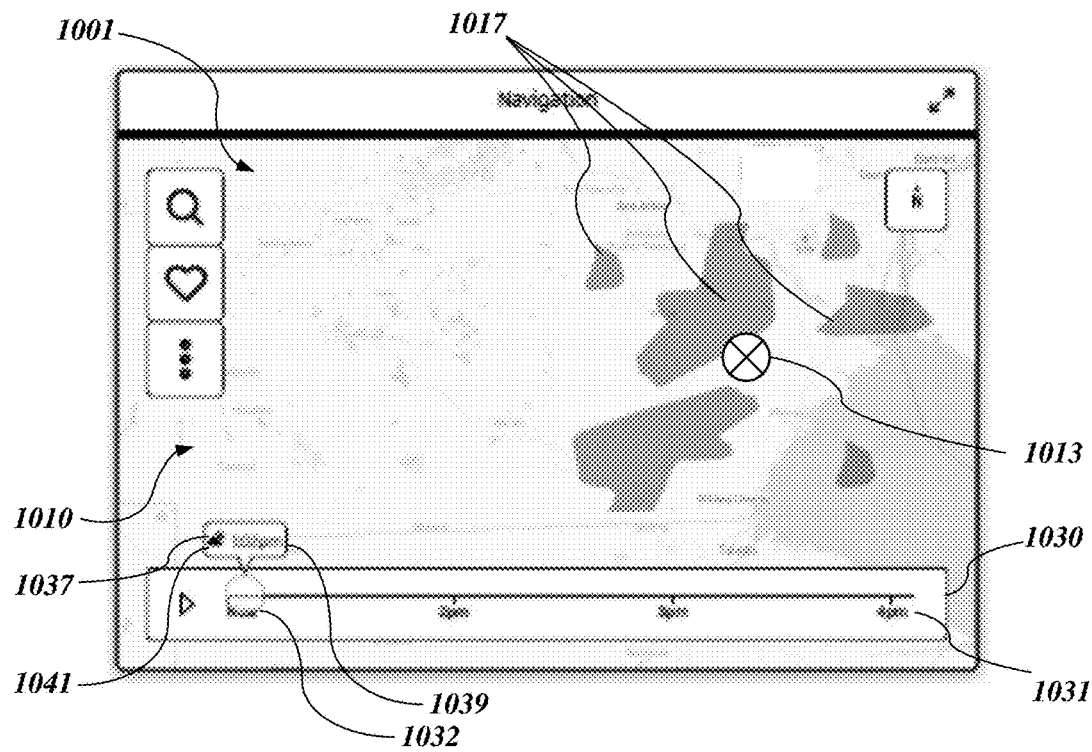

Referring to FIGS. 10A and 10B, integrated route maps 1000 and 1001, respectively, may be displayed to represent weather conditions around a user's location. Referring to FIG. 10A, the integrated route map 1000 includes a map 1010 of an area near or surrounding a user's location as represented by a location indicator 1012. As previously described, the location for the map 1010 and the position indicator 1012 may be determined from GPS data or other sources. As also previously described, the integrated route map display system 100 (FIG. 1) is configured to retrieve weather forecast data for the area and displays weather formations 1016 currently in the area covered by the map 1010. As in other embodiments, the integrated route map 1000 may also include a timeline 1030 that may span a period of time beginning at a current time. The timeline 1030 also may include a sliding input 1032 that may be moved along the timeline 1030 to choose a different time to display for the integrated route map 1000 to view changing, developing, and/or predicted weather conditions as described with reference to FIGS. 7A and 7B. However, it will be appreciated that, because the user has not entered and/or is not following a specified route, moving the sliding input 1032 may show changes in the weather conditions but will not move the location indicator 1012 as shown in FIGS. 7A and 7B; instead, the location indicator 1012 will correspond with the current location.

The integrated route map 1000 may also include a current situation indicator 1036 to show a specific time 1038 which may display the present time (12:47 p.m. in the example of FIG. 7A) or a time associated with a position of the sliding input 1032. The current situation indicator 1036 also may include a weather indicator 1040 that represents the weather for the user's location 1012. The weather indicator 1040 may present a symbol (as shown in FIG. 10A) that shows weather and daylight conditions at the user's current location at the current or selected time.

Referring to FIG. 10B, another integrated route map 1001 again includes the map 1010 of the area around the user's location but at a later time. An updated position indicator 1013 shows a user's new location.

It will be appreciated that an updated current situation indicator 1037 shows the current time 1039 (1:02 p.m. in the example of FIG. 10B). The integrated route map 1001 of FIG. 10B shows the updated weather formations 1017. The current situation indicator 1037 also includes a weather indicator 1041 that, in the example of FIG. 10B, shows that the weather conditions have changed from partly cloudy to rainy.

In addition, because the current time 1039 has advanced, in various embodiments, the timeline 1030 may shift to maintain a same time range accessible by advancing the sliding input 1032. In the example of FIGS. 10A and 10B, the time range spanned by the timeline 1030 is three hours. Thus, because the current time 1039 is now after 1:00 p.m., the range spanned by the timeline 1030 now extends to include an end time 1031 beyond 4:00 p.m.

In addition to scrolling the timeline 1030 to maintain a consistent time range from the current time, the timeline 1030 (FIGS. 10A and 10B) may be scaled to encompass travel along a planned route and/or for an additional time beyond the anticipated arrival. By scaling the time range, by using the sliding input 1032, a user can access weather conditions throughout travel along the planned route. By adding an additional time beyond the anticipated arrival, for example, if the user may be delayed or plans to engage in an outdoor activity at the user's destination, the user can check on what the weather will be after an estimated arrival.

Figure 11A:
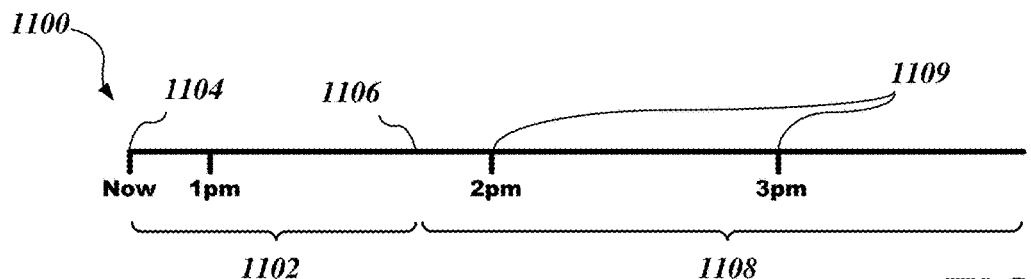
FIGS. 11A-11F are schematic diagrams of timelines scaled and incremented to correspond to length of a planned trip.

Referring to FIGS. 11A-11F, in various embodiments, timelines are scaled based on an anticipated length of a trip. Referring to FIG. 11A, a timeline 1100 for a one-hour trip 1102 spans from a current time 1104 (prior to 1:00 p.m.) through an arrival time 1106 (prior to 2:00 p.m.). In various embodiments, a post-arrival interval 1108 is included in the represented time range. In various embodiments, the post-arrival interval 1108 may be a default level, which is two hours in the example of FIGS. 11A-11F. It will be appreciated that the post-arrival interval 1108 may be changed by a user by manipulating user settings. Referring again to FIG. 11A, the post-arrival interval extends to a time prior to 4:00 p.m. In the example of FIG. 11A, hourly time increments 1109 are displayed. As described below, for a longer trip, longer time increments may be displayed so as not to visually clutter the timeline.

Figure 11B:
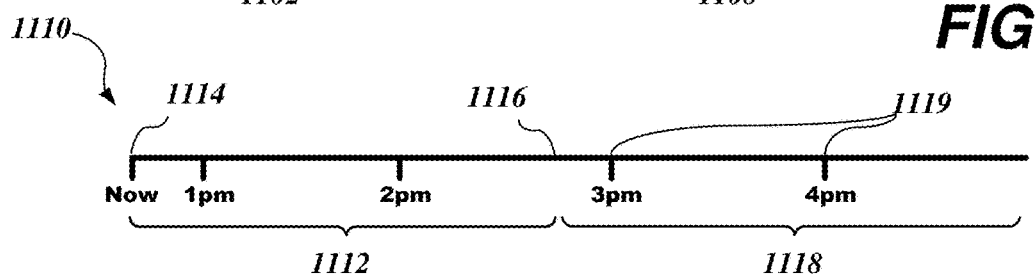

Referring to FIG. 11B, a timeline 1110 for a two-hour trip 1112 spans from a current time 1114 (prior to 1:00 p.m.) through an arrival time 1116 (prior to 3:00 p.m.). A post-arrival interval 1118 of two hours is included in the time range represented. As shown in FIG. 11B, in various embodiments, the timeline 1110 is scaled to encompass the combined two-hour trip 1112 and the post-arrival interval 1118. Referring again to FIG. 11A, the timeline 1100 extended from a time prior to 1:00 p.m. to a time prior to 4:00 p.m. to encompass the one-hour trip 1102 and the two-hour post-arrival interval 1108. Accordingly, the timeline 1100 was scaled so that each hour represents approximately one-third of the timeline 1100. By comparison, the timeline 1110 of FIG. 11B is scaled to encompass the two-hour trip 1112 beginning prior to 1:00 p.m. and the two-hour post-arrival interval 1118. Thus, the timeline 1110 extends from the current time 1114 prior to 1:00 p.m. to a time prior to 5:00 p.m. with the timeline 1110 scaled so that each hour represents approximately one-fourth of the timeline 1110. The timeline 1110 continues to display hourly time increments 1119.

Figure 11C:
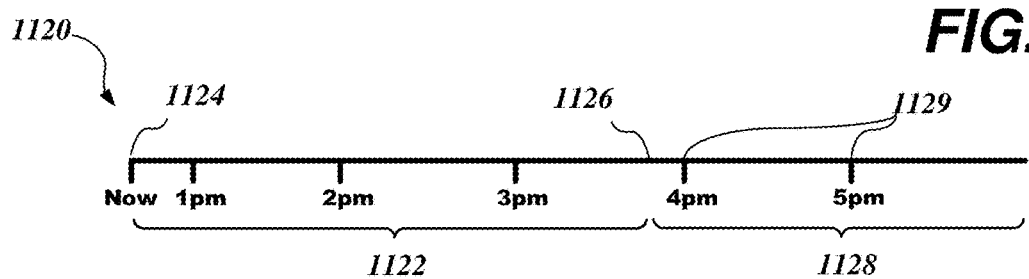

Referring to FIG. 11C, a timeline 1120 for a three-hour trip 1122 spans from a current time 1124 (prior to 1:00 p.m.) through an arrival time 1126 (prior to 4:00 p.m.). A post-arrival interval 1128 of two hours is included in the time range represented. As shown in FIG. 11C, in various embodiments, the timeline 1120 is scaled to encompass the combined three-hour trip 1122 and the post-arrival interval 1128. Thus, the timeline 1120 of FIG. 11C extends from a time prior to 1:00 p.m. to a time prior to 6:00 p.m. to encompass the three-hour trip 1120 and the two-hour post-arrival interval 1128. The timeline 1120 is scaled so that each hour represents approximately one-fifth of the timeline 1120. The timeline 1120 continues to display hourly time increments 1129.

Figure 11D:
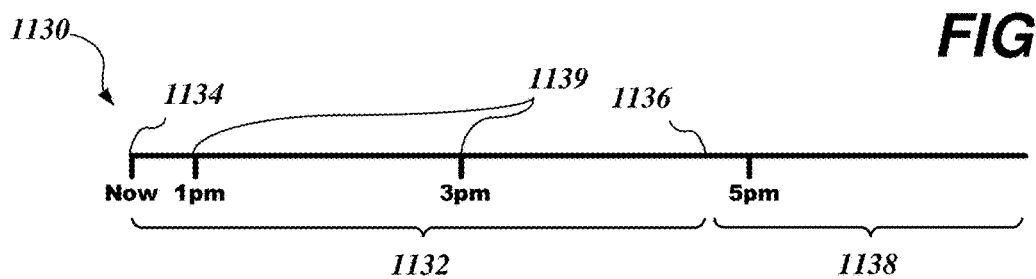

Referring to FIG. 11D, a timeline 1130 for a four-hour trip 1132 spans from a current time 1134 (prior to 1:00 p.m.) through an arrival time 1136 (prior to 5:00 p.m.). A post-arrival interval 1138 of two hours is included in the time range represented. As shown in FIG. 11D, in various embodiments, the timeline 1130 is scaled to encompass the combined four-hour trip 1132 and the default post-arrival interval 1138. Thus, the timeline 1130 of FIG. 11D extends from a time prior to 1:00 p.m. to a time prior to 7:00 p.m. to encompass the four-hour trip 1130 and the two-hour post-arrival interval 1138. The timeline 1130 is scaled so that each hour represents approximately one-sixth of the timeline 1130. However, unlike the example of FIGS. 11A-11C, the timeline 1130 displays two-hour time increments 1139. The longer, two-hour time increments 1139 allow the entire time range to be represented without the increments 1139 being compressed too closely together to be readable.

Figure 11E:
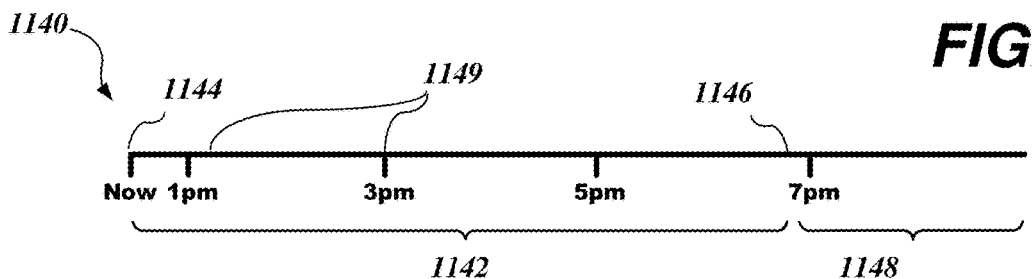

Referring to FIG. 11E, a timeline 1140 for a six-hour trip 1142 spans from a current time 1144 (prior to 1:00 p.m.) through an arrival time 1146 (prior to 7:00 p.m.). A post-arrival interval 1148 of two hours is included in the time range represented. As shown in FIG. 11E, in various embodiments, the timeline 1140 is scaled to encompass the combined four-hour trip 1142 and the default post-arrival interval 1148. Thus, the timeline 1140 of FIG. 11E extends from a time prior to 1:00 p.m. to a time prior to 9:00 p.m. to encompass the six-hour trip 1140 and the two-hour post-arrival interval 1148. The timeline 1140 is scaled so that each hour represents approximately one-eighth of the timeline 1140. As in the example of FIG. 11D, the timeline 1140 displays two-hour time increments 1149.

Figure 11F:
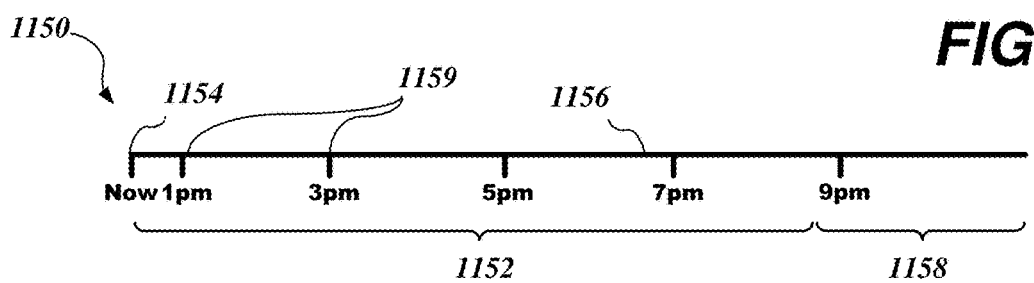

Referring to FIG. 11F, a timeline 1150 for an eight-hour trip 1152 spans from a current time 1154 (prior to 1:00 p.m.) through an arrival time 1156 (prior to 9:00 p.m.). A post-arrival interval 1158 of two hours is included in the time range represented. As shown in FIG. 11F, in various embodiments, the timeline 1150 is scaled to encompass the combined eight-hour trip 1152 and the default post-arrival interval 1158. Thus, the timeline 1150 of FIG. 11F extends from a time prior to 1:00 p.m. to a time prior to 11:00 p.m. to encompass the eight-hour trip 1150 and the two-hour post-arrival interval 1158. The timeline 1150 is scaled so that each hour represents approximately one-tenth of the timeline 1150. As in the example of FIGS. 11D and 11E, the timeline 1150 displays two-hour time increments 1159.

It will be appreciated that, for even longer trips spanning additional hours or days, the timelines may be appropriately scaled and may include time increments ratiometrically appropriate to fit the scaled timeline. In addition, a length of post-arrival interval may be set, changed, or removed. In any case, the scaled timelines enable a user, for example, using a sliding input, to view weather conditions that may be expected along the route.

It also will be appreciated that, in various embodiments, once the user is en route to the destination, the current time will change, thus changing the scale of the timeline. For example, as previously described, at the start of the eight-hour trip 1152 of FIG. 11F, the timeline 1150 is scaled so that each hour represents one-tenth of the timeline and time is represented in two-hour increments 1159. However, once the user is, for example, within one-hour of reaching the destination, with the post-arrival interval 1158 of two hours, the timeline 1150 may be scaled so that each hour represents one-third of the timeline 1150 and the timeline 1150 displays one-hour increments like the timeline 1100 of FIG. 11A (but with a different current time, one hour from arrival).

It also will be appreciated that, as a user travels along a route, in various embodiments, the timeline is scaled so that an originating point on the timeline is updated to a current time. In other words, rather than the timeline including what has transpired in the past, the timeline is updated to include current and future times. This updating of the originating point was depicted in FIGS. 10A and 10B.

Referring to FIGS. 12A-12D, in various embodiments, a user may be presented with an opportunity to choose from among different routes based on anticipated weather conditions and/or other conditions. Using a sliding input 1232, as previously described with reference to FIGS. 7A-7B and/or animations as described with reference to FIGS. 8A-8D, a user can evaluate possible routes based on how weather and/or other conditions may affect travel on each route.

Figure 12A:
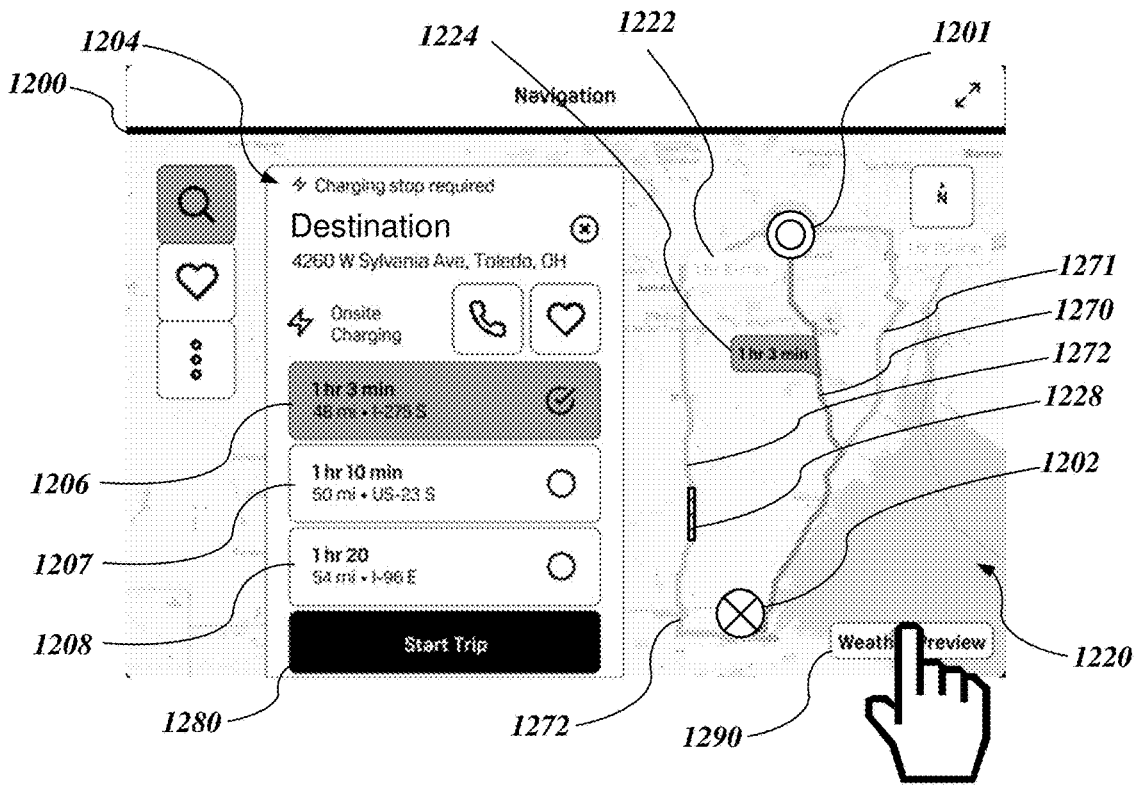
FIGS. 12A-12C are block diagrams of an illustrative screen display show comparison of alternative routes.

Referring to FIG. 12A, on a selection screen 1200, after a user specifies a destination 1202, an input field 1204 lists multiple possible routes 1206-1208 between a starting location 1201 to a destination 1202. The listing of the multiple routes 1206-1208 may also include information identifying the route and a travel time. Routes 1270-72 also may be graphically displayed on a map 1220 encompassing the routes 1270-72. Travel time indicators 1222 and 1224 also may be superimposed on the map 1220 of an area encompassing the starting location 1201 and the destination 1202. The travel time indicator 1224 may be highlighted to correspond with a recommended or currently selected route 1206. In various embodiments, the map 1220 may signal non-weather travel conditions 1228, such as traffic or construction zones. Once the user has chosen a route, a user can select a start trip option 1280 to begin trip navigation, or the user may select a weather preview option 1290 to view anticipated weather or other conditions that may affect the routes 1206-1208. As previously described, a touchscreen or other controls may be used to receive user selections.

Figure 12B:
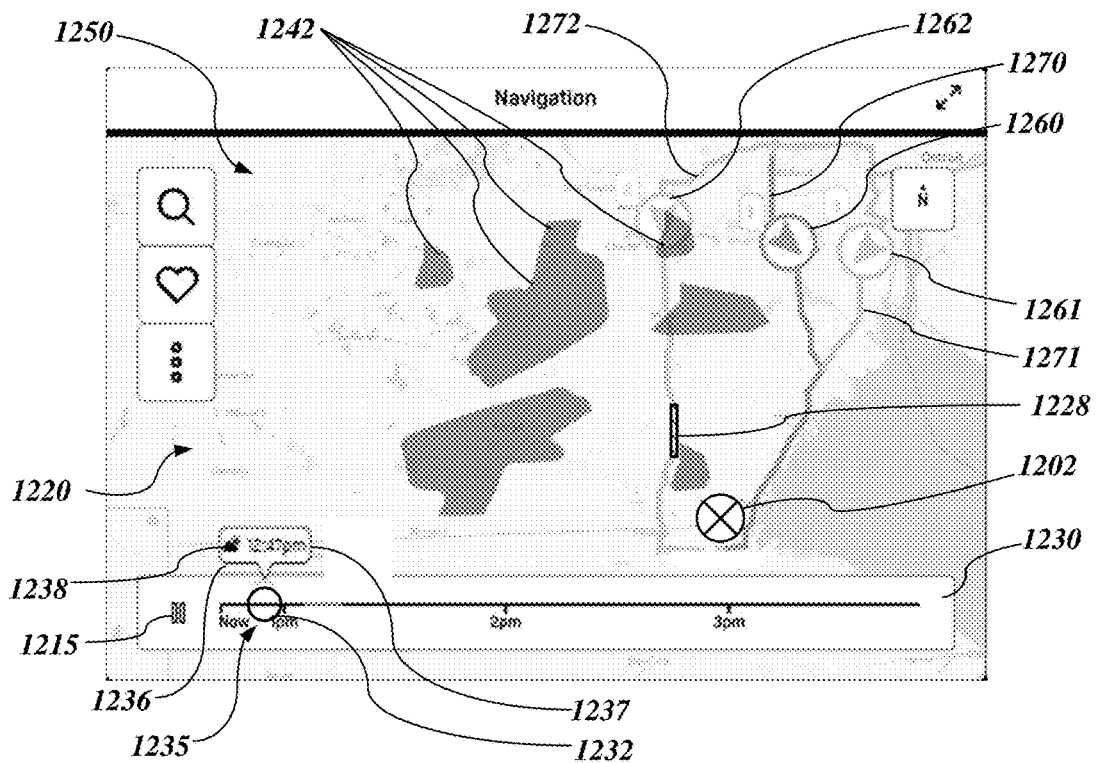

Referring to FIG. 12B, when the user selects the weather preview option 1290 (FIG. 12A), the user may engage either a sliding input 1232 or an animation control 1215 to manually or automatically, respectively, advance an integrated route map 1250 to show how the anticipated weather conditions or other conditions will affect the routes 1206-1208. As the time presented on the integrated route map 1250 is advanced to show conditions at various times, position indicators 1260-62 show where the user might be projected to be along each route at each time. The position indicator 1260 corresponding to the recommended or selected route 1206 (FIG. 12A) is highlighted. In various embodiments, a current status indicator 1236, as described with reference to FIGS. 7A-B, shows information for a time 1237 at a selected position 1235 on a timeline 1230. For a recommended or currently selected route, the current status indicator 1236 shows a weather indicator 1238 to show, for example, the current weather at a location of the position indicator 1260 for the recommended or selected route at the selected position 1235 on the timeline 1230.

It will be appreciated that, looking at the integrated route map 1250, the user can compare the conditions for the different routes 1206-1208. For example, on a route 1272 associated with the position indicator 1262 (labelled as route 2 on the integrated route map 1250), at the presented time, rainy conditions may exist and the road condition 1228 (e.g., traffic or construction) may affect travel. On the other hand, the routes 1271 (labelled as route 3) and 1270 (labelled as route 1) associated with the position indicators 1261 and 1262, respectively, do not show rainy conditions at the presented time 1235 or any road conditions ahead. In the current status indicator 1236, at the time 1237 represented, the weather situation indicator 1238 shows partly cloudy weather.

Figure 12C:
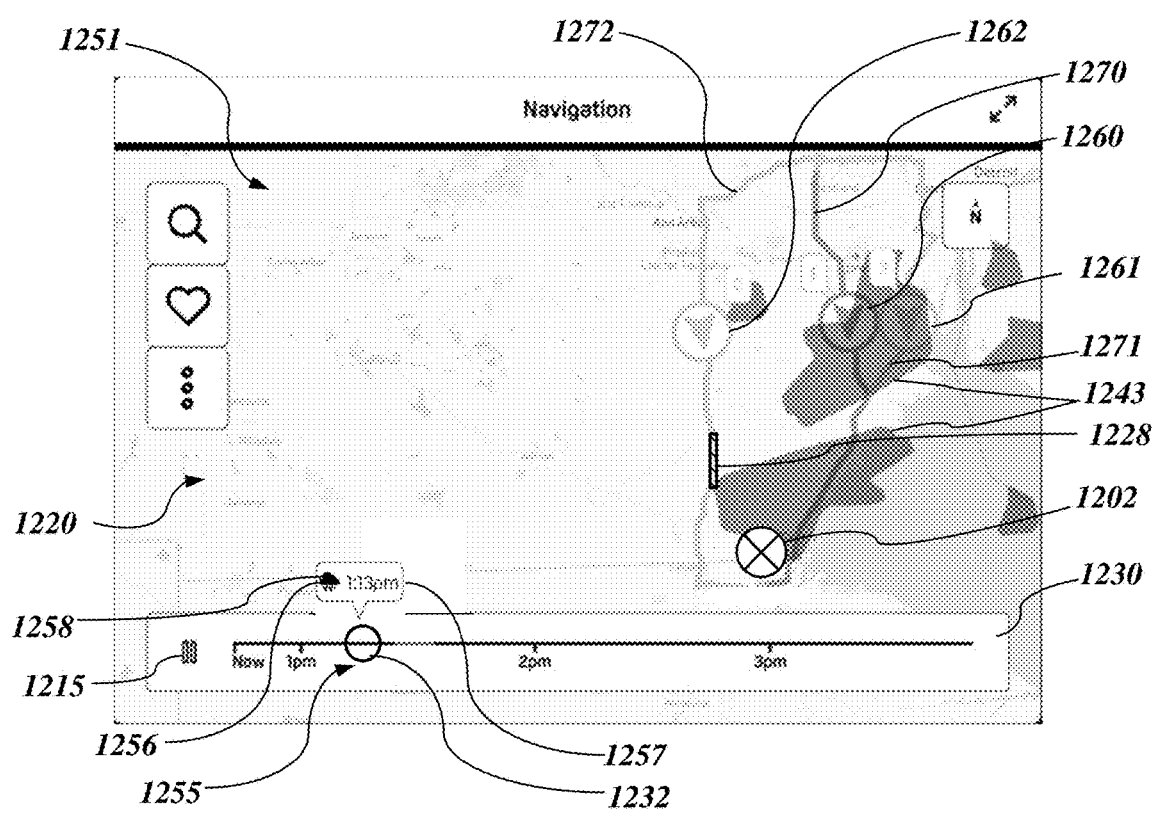

Referring to FIG. 12C, an integrated route map 1251 is presented for a next position 1255 along the timeline 1230 as a result of user selection or continuing animation. Weather formations 1243 that have moved or developed are updated on the integrated route map 1251. As a result, on the route 1272 associated with the position indicator 1262 (labelled as route 2), at the presented time, the weather has cleared, although the road condition 1228 (e.g., traffic or construction) persists. On the other hand, the routes 1271 (labelled as route 3) and 1270 (labelled as route 1) associated with the position indicators 1261 and 1262 respectively, will encounter rain at the next position 1255 along the timeline 1230. An updated current status indicator 1256 shows that, at a time 1257 at a selected position 1255 on the timeline 1230, a weather situation indicator 1258 reporting that there will be rainy weather.

As previously mentioned, the user can manually engage the sliding input 1232 to manipulate the integrated route map or may engage an animation control 1215 to automatically advance the views presented by the integrated route map. When animated, the integrated route map may continue to loop through the views. When the user is done with the weather views, the user may revert back to the selection screen 1200 (FIG. 12A) to select or change a route and activate a start trip option 1280 and begin travel. As previously described, the integrated route map may be updated to show developing weather conditions and other conditions as the user travels.

It will be appreciated that integrated route maps are not limited to showing only particular types of atmospheric or road conditions. In various embodiments, other conditions may be included instead of or in addition to, for example, precipitation conditions.

Figure 13A:
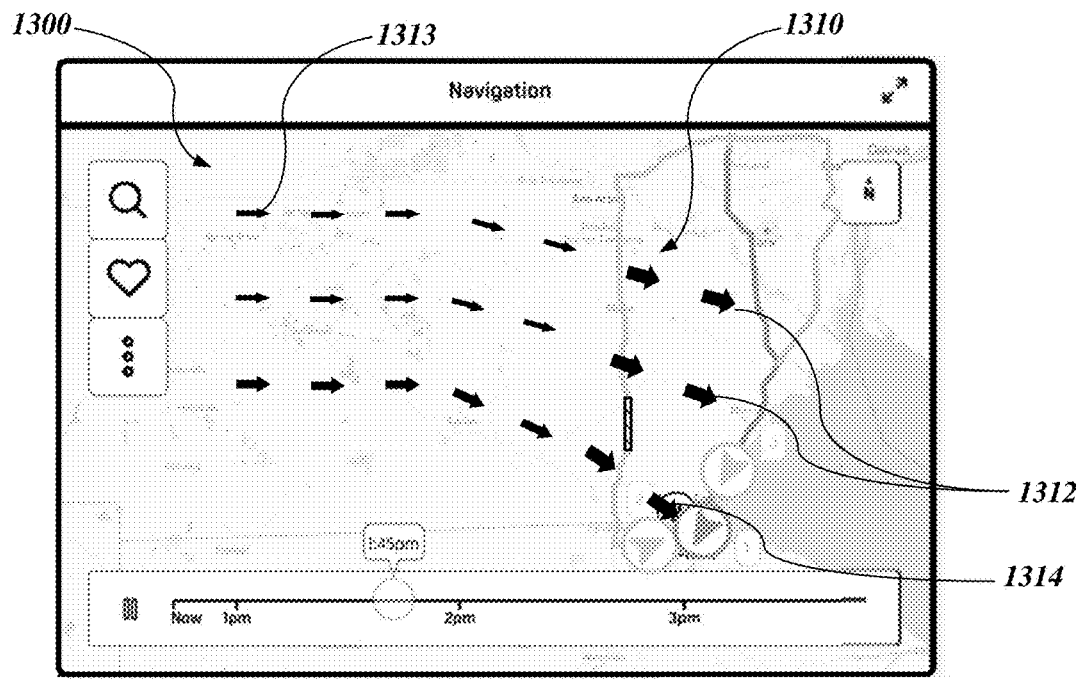
FIGS. 13A and 13B are block diagrams of an illustrative screen display showing additional atmospheric conditions.

For example, referring to FIG. 13A, an integrated route may 1300 may include wind conditions 1310 instead of or in addition to other conditions. The wind conditions 1310 may be represented, for example, by arrows 1312 to show wind direction. In addition, the arrows may be of varying thickness or color to show wind speed with, for example, a thinner arrow 1313 showing a low wind speed and a thicker arrow 1314 showing a high wind speed. The wind conditions 1310 may be updated on predictive maps used for planning purposes or as the user is travelling, as previously described with regard to precipitation conditions with reference to FIGS. 7A-7B, 8A-8D, 9A and 9B, 10A and 10B, and 12A-C. The wind conditions 1310 may be of interest to any number of users, including individuals who drive convertibles, individuals who prefer to drive with their windows open, individuals who drive high-profile trucks or pull tall trailers that are subject to wind forces.

Figure 13B:
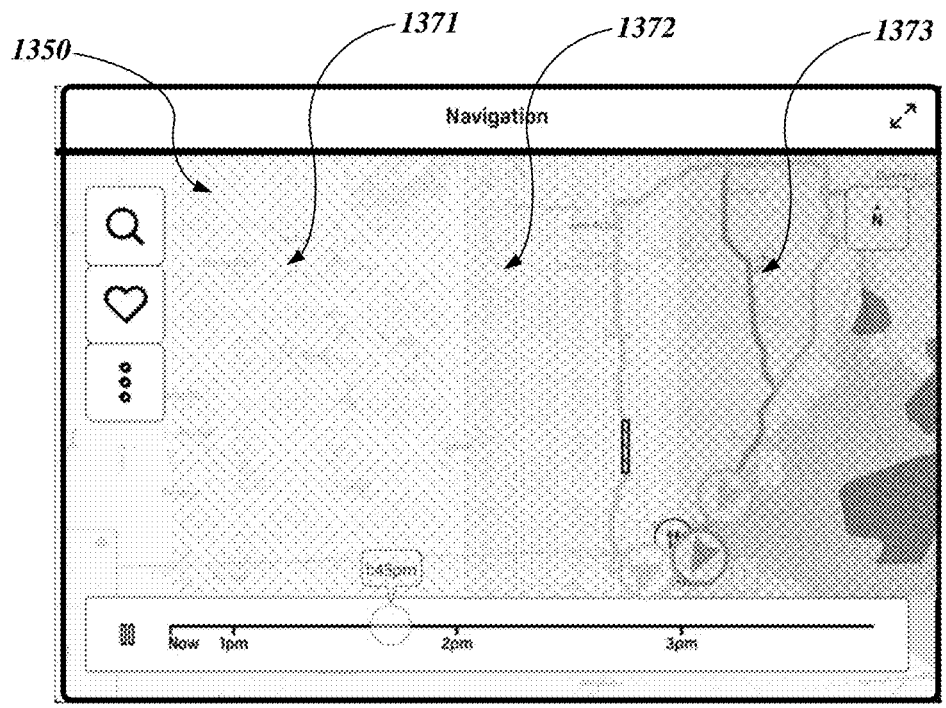

Similarly, referring to FIG. 13B, an integrated route may 1350 may include other atmospheric conditions 1360, such as ultraviolet (UV) index, air quality, allergen density, or any other conditions. The other atmospheric conditions 1360 may be represented, for example, by shaded overlays 1370-1372 to show ranges of increased index or intensity. For example, if the weather condition is a pollution index, a denser pattern (or a different color) may reflect a higher pollution content. Thus, a user may choose to travel a route in an area spanned by the overlay 1372 instead of an area spanned the overlay 1373 to avoid the more polluted air. Similarly, as previously described, a user may plan when to travel to avoid undesirable air quality or UV levels. Again, these conditions may be combined with other travel or weather conditions. It will be appreciated that which conditions to show may be made by changing user options.

Figure 14:
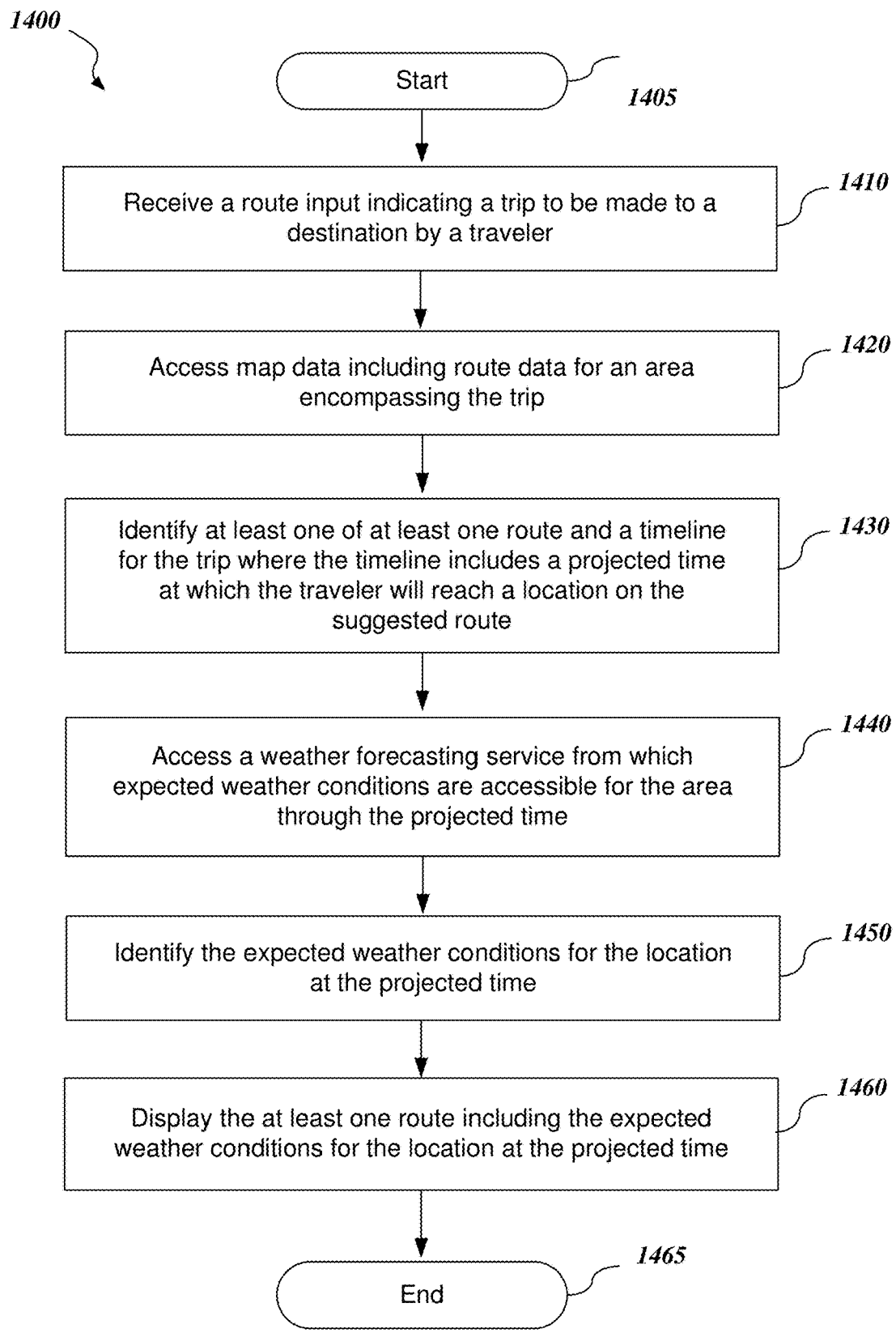
FIG. 14 is a flow chart of an illustrative method for presenting an integrated route map that displays a route and expected weather conditions.

Referring to FIG. 14, in various embodiments an illustrative method 1400 is provided for presenting an integrated route map displaying the route and the expected weather conditions a traveler may encounter on the route. The method 1400 starts at a block 1405. At a block 1410, a route input is received indicating a trip to be made to a destination by a traveler. At a block 1420, map data is accessed including route data for an area encompassing the trip. At a block 1430, at least one route and a timeline for the trip are identified where the timeline includes a projected time at which the traveler will reach a location on the at least one route. At a block 1440, a weather forecasting service is accessed from which expected weather conditions are accessible for the area through the projected time. At a block 1450, the expected weather conditions are identified for the location at the projected time. At a block 1460, the at least one route is displayed including the expected weather conditions for the location at projected time. The method ends at a block 1465.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
   a computing device having computer-readable media storing computer-executable instructions configured to cause the computing device to:
   receive an input indicative of a trip to be made to a destination by a traveler;
   access a store of route data for an area encompassing the trip;
   identify at least one route for the trip;
   access a weather forecasting service from which expected weather conditions are accessible for the area through a projected time;
   identify the expected weather conditions for a location at the projected time;
   display an integrated route map including the at least one route and the expected weather conditions for the location at the projected time;
   generate a graphical representation of a timeline for the trip within the integrated route map and advance and rewind the integrated route map between a current time and at least the projected time by the traveler moving a sliding input relative to the graphical representation of the timeline, wherein the sliding input comprises a situation indicator comprising a time indicator and a weather indicator providing a time and an expected weather condition for a corresponding location along the graphical representation of the timeline, wherein the situation indicator is translated along the graphical representation of the timeline with the sliding input, and wherein the graphical representation of the timeline for the trip and the time indicator and the weather indicator of the situation indicator are each displayed simultaneously with the integrated route map including the at least one route and the expected weather conditions for the corresponding location at a time selected utilizing the sliding input;
   present a progress indicator graphically representing a position of the traveler on the integrated route map; and
   reposition, in response to a received input from the sliding input indicating the selected time, the progress indicator to the corresponding location at the selected time and display, simultaneously within the integrated route map including the at least one route and the expected weather conditions for the corresponding location at the selected time, the time indicator and the weather indicator of the situation indicator, the sliding input, and the repositioned progress indicator.

2. The system of claim 1, further comprising computer-executable instructions configured to cause the computing device to identify the timeline for the trip.

3. The system of claim 2, wherein the timeline includes the projected time at which the traveler will reach a location on the at least one route.

4. The system of claim 3, further comprising computer-executable instructions configured to automatically retrieve updated expected weather conditions via the weather service interface for inclusion in the integrated route map.

5. The system of claim 3, wherein a status indicator presents localized weather conditions for a position on the integrated route map.

6. The system of claim 1, further comprising computer-executable instructions configured to:
   access weather radar data through at least the projected time including at least one datum chosen from actual weather radar data and projected weather radar data; and
   correlate the weather radar data with the timeline for the trip and superimpose the weather radar data on the integrated route map for a selected time for which the integrated route map is displayed.

7. The system of claim 6, further comprising computer-executable instructions configured to:

reposition the superimposed weather radar data on the integrated route map to correspond with the selected time.

8. The system of claim 7, further comprising computer-executable instructions configured to generate the graphical representation of the timeline and to display an animated series of views of the integrated route map for a plurality of times along the timeline.

9. The system of claim 7, wherein the graphical representation of the timeline is scaled to encompass a time range spanning an anticipated length of the trip.

10. The system of claim 9, wherein the time range includes a post-arrival interval following an anticipated arrival time.

11. The system of claim 7, wherein time increments presented on the graphical representation of the timeline are scaled to relative to an anticipated length of the trip.

12. The system of claim 7, wherein an originating point of the timeline is updated to correspond to the current time.

13. The system of claim 1, further comprising computer-executable instructions configured to, in response to the traveler traveling the route, provide at least one navigation cue as to a next navigational maneuver included in the at least one route.

14. The system of claim 1, wherein the computing device includes one of:
a navigation system integrated into a vehicle;
a portable computing device transportable aboard the vehicle including at least one device chosen from a portable computer, a tablet computer, a smartphone, and a smartwatch; and
a desktop personal computer.

15. The system of claim 1, wherein a route input interface is configured to receive at least one input chosen from an origin input, a destination input, a departure time input, and at least one waypoint input chosen from an intermediate destination on the trip and a layover time to be spent at the intermediate destination.

16. The system of claim 1, wherein the store of route data includes at least one data source chosen from a local store of route data maintained within the system and a route data service accessible via a network to obtain the route data for the area.

17. The system of claim 1, wherein the expected weather conditions include at least one condition chosen from expected precipitation, expected temperature, expected visibility, available daylight as a result of a time of sunrise and a time sunset at the location, an ultraviolet index, an allergen index, humidity, and a pollution index.

18. A vehicle comprising:
a passenger compartment;
a drive system configured to motivate, accelerate, decelerate, stop, and steer the vehicle; and
a computing device having computer-readable media storing computer-executable instructions configured to cause the computing device to:
receive an input indicative of a trip to be made to a destination by a traveler;
access a store of route data for an area encompassing the trip;
identify at least one route for the trip;
access a weather forecasting service from which expected weather conditions are accessible for the area through a projected time;
identify the expected weather conditions for a location at the projected time;
display an integrated route map including the at least one route and the expected weather conditions for the location at the projected time;
generate a graphical representation of a timeline for the trip within the integrated route map and advance and rewind the integrated route map between a current time and at least the projected time by the traveler moving a sliding input relative to the graphical representation of the timeline, wherein the sliding input comprises a situation indicator comprising a time indicator and a weather indicator providing a time and an expected weather condition for a corresponding location along the graphical representation of the timeline, wherein the situation indicator is translated along the graphical representation of the timeline with the sliding input, and wherein the graphical representation of the timeline for the trip and the time indicator and the weather indicator of the situation indicator are each displayed simultaneously with the integrated route map including the at least one route and the expected weather conditions for the corresponding location at a time selected utilizing the sliding input;
present a progress indicator graphically representing a position of the traveler on the integrated route map; and
reposition, in response to a received input from the sliding input indicating the selected time, the progress indicator to the corresponding location at the selected time and display, simultaneously within the integrated route map including the at least one route and the expected weather conditions for the corresponding location at the selected time, the time indicator and the weather indicator of the situation indicator, the sliding input, and the repositioned progress indicator.

19. The vehicle of claim 18, further comprising computer-executable instructions configured to identify the timeline for the trip, wherein the timeline includes the projected time at which the traveler will reach a location on the at least one route.

20. A computer-implemented method comprising:
receiving a route input indicating a trip to be made to a destination by a traveler;
accessing map data including route data for an area encompassing the trip;
identifying at least one of at least one route and a timeline for the trip wherein the timeline includes a projected time at which the traveler will reach a location on the at least one route;
accessing a weather forecasting service from which expected weather conditions are accessible for the area through the projected time;
identifying the expected weather conditions for the location at the projected time;
displaying an integrated route map including the at least one route and the expected weather conditions for the location at the projected time;
generating a graphical representation of a timeline for the trip within the integrated route map and advancing and rewinding the integrated route map between a current time and at least the projected time by the traveler moving a sliding input relative to the graphical representation of the timeline, wherein the sliding input comprises a situation indicator comprising a time indicator and a weather indicator providing a time and an expected weather condition for a corresponding location along the graphical representation of the timeline, wherein the situation indicator is translated along the graphical representation of the timeline with the sliding input;

displaying with the at least one route including the expected weather conditions for the location at the projected time the graphical representation of the timeline for the trip such that the time indicator and the weather indicator of the situation indicator are each displayed simultaneously with the integrated route map including the at least one route and the expected weather conditions for the corresponding location at a time selected utilizing the sliding input;

presenting a progress indicator graphically representing a position of the traveler on the integrated route map; and repositioning, in response to a received input from the sliding input indicating the selected time, the progress indicator to the corresponding location at the selected time and display, simultaneously within the integrated route map including the at least one route and the expected weather conditions for the corresponding location at the selected time, the time indicator and the weather indicator of the situation indicator, the sliding input, and the repositioned progress indicator.

\* \* \* \* \*